US012799983B2

(12) United States Patent
Olsen

(10) Patent No.: US 12,799,983 B2
(45) Date of Patent: Nov. 17, 2026

(54) ANTI-STATIC BEARING HOUSE

(71) Applicant: NGI A/S, Nørresundby (DK)

(72) Inventor: Tomas Hecht Olsen, Klarup (DK)

(73) Assignee: NGI A/S, Nørresundby (DK)

( * ) Notice: Subject to any disclaimer, the term of this patent is extended or adjusted under 35 U.S.C. 154(b) by 86 days.

(21) Appl. No.: 18/717,990

(22) PCT Filed: Dec. 5, 2022

(86) PCT No.: PCT/EP2022/084394
§ 371 (c)(1),
(2) Date: Jun. 7, 2024

(87) PCT Pub. No.: WO2023/104709
PCT Pub. Date: Jun. 15, 2023

(65) Prior Publication Data

US 2025/0052281 A1 Feb. 13, 2025

(30) Foreign Application Priority Data

Dec. 9, 2021 (DK) ............................. PA202101177

(51) Int. Cl.
*F16C 41/00* (2006.01)
*F16C 19/52* (2006.01)
*F16C 35/04* (2006.01)

(52) U.S. Cl.
CPC ............ *F16C 41/002* (2013.01); *F16C 19/52* (2013.01); *F16C 35/042* (2013.01)

(58) Field of Classification Search
CPC ..................................................... F16C 41/002
See application file for complete search history.

(56) References Cited

U.S. PATENT DOCUMENTS

| | | | | |
|---|---|---|---|---|
| 3,564,477 | A * | 2/1971 | Pompei | H01R 39/643 439/271 |
| 4,973,172 | A | 11/1990 | Nisley et al. | |
| 6,102,574 | A * | 8/2000 | Proschel | F16C 19/54 105/218.1 |
| 6,250,808 | B1 | 6/2001 | Ichiyama | |

(Continued)

FOREIGN PATENT DOCUMENTS

| | | | |
|---|---|---|---|
| CA | 3162255 A1 | | 8/2021 |
| DE | 20 2006 018 877 | * | 5/2008 |

(Continued)

OTHER PUBLICATIONS

Translation of DE 20 2006 018 877 obtained Dec. 3, 2025.*
Search Report dated May 30, 2022 issued in corresponding Danish Patent Application No. PA 2021 01177.

*Primary Examiner* — James Pilkington
(74) *Attorney, Agent, or Firm* — Nath, Goldberg & Meyer; Joshua B. Goldberg

(57) ABSTRACT

A bearing house including a bearing house body for holding a bearing; a shield forming a shaft insertion for inserting a shaft into the bearing house, and at least one conducting element providing an electrical connection between the inside of the bearing house body to an outside material. The electrical connection may be configured to transfer static electricity through the bearing, when the bearing is inserted into the bearing house, through the at least one conducting element to the outside material.

12 Claims, 13 Drawing Sheets

(56) References Cited

U.S. PATENT DOCUMENTS

| | | | | |
|---|---|---|---|---|
| 9,261,143 | B2 | 2/2016 | Mola et al. | |
| 11,965,560 | B2 * | 4/2024 | Barthelme | F16C 35/077 |

FOREIGN PATENT DOCUMENTS

| | | | | |
|---|---|---|---|---|
| GB | 2313418 | A | 11/1997 | |
| JP | 2001-140911 | A | 5/2001 | |
| JP | 2001-140913 | A | 5/2001 | |
| WO | 2021/151983 | A1 | 5/2021 | |
| WO | WO-2021151985 | A1 * | 8/2021 | F16C 33/20 |

* cited by examiner

SECTION A-A

ANTI-STATIC BEARING HOUSE

TECHNICAL FIELD OF THE INVENTION

The present invention relates to a bearing house for use in environments where the environmental hygiene is highly prioritised. In particular the present invention relates to a waterproof bearing house for use in areas where the environmental hygiene is highly prioritised, and where static electricity formed are easily discharged from the bearing house, resulting in a reduction in maintenance and a limitation or even avoiding deposit or accumulation of dirt, grime, microbial material, or allergens, on, in or around the bearing house and an extended lifetime of the bearing house and the bearing.

BACKGROUND OF THE INVENTION

For the last decade, the food and beverage industry has seen a significant increase in products that needs to be recalled because of contamination of microorganisms, allergens or dirt that are not intended to be present in the food product.

In this respect bacterial contamination and undeclared allergens together represent about 75% of the top FDA food recall causes based on units.

Many companies provide strict guidelines and measures on safety practice in the production zones to protect the food products. These might include measures such as posted signs encouraging hand-washing or purchasing hygienically designed "food grade" machines.

Due to the increasing number of recalls proactive food safety has become the foremost concern for food and beverage executives and different approached are used to reduce or avoid the contaminated food product.

One approach is inspection or regulatory control of food products and production lines which is highly undesirable for the manufacture as inspection or control is time consuming and costly. Results of the inspection or control may lead to closure of the process line until the devices and equipment have been properly cleaned. This clearly has a strong impact on the turnover of the manufacturer in respect of down time, and no product production. Thus, the alternative approach is to ensure proper cleaning of the devices and equipment to ensure a clean and un-contaminated environment and to ensure the food safety is in top.

One of the risk zones for contamination with dirt, microorganisms and allergens and that has shown to be difficult to clean properly is the bearing houses and around the bearing houses.

It is generally understood that static electricity may be created by parts moving, sliding and rotating typically from motors, belts, stirring guides sliding against belts, sprockets rollers and of cause from bearing houses. The choice of materials and design of the bearing house may be crucial to how big a problem static electricity and how the problem should be solved.

If this static electricity is not managed, or if the static electricity mitigation system (often a shaft-grounding brush) is not maintained and fails, the static electricity seeks an alternate path to ground. That path may be the metal component—typically a bearing or seal—closest to the shaft, and electric arcing to that component is termed electrostatic discharge. One of the problems with arcing may be that it erodes metal surfaces and opens the tight clearances that these components depend upon for proper operation. If undetected, electrostatic discharge will gradually destroy the bearing and/or the sealings, change the shaft dynamics of the machine, and may ultimately result in damage to the shaft that requires expensive rework. This may also result in an increased risk of contamination, difficulties in cleaning and decreased productivity because of the change in shaft dynamics and increase wear of the bearing and/or on the bearing house.

A further challenge with unmanaged static electricity may be that sparks may be created. Sparks caused by static electricity have in some industries to be a significant source of fires and explosions in many industries. Sparks release energy that can ignite flammable or explosive materials. While hazards for fires may be obvious with flammable chemicals, industries where there is a lot of dust, like flour mills, can also be at risk for explosions due to electrostatic sparks.

Hence, an improved bearing house would be advantageous, and in particular a bearing house which is waterproof, even at increased angular movements when misaligned during installation, whereby wash-down and cleaning may be more efficient and/or more reliable resulting in a limitation or even to avoid deposit or accumulation of dirt, grime, microbial material, or allergens, on, in or around the bearing house, and where static electricity formed may be discharged would be advantageous.

SUMMARY OF THE INVENTION

Thus, an object of the present invention relates to a bearing house for use in environments where the environmental hygiene is highly prioritised.

In particular, it is an object of the present invention to provide a bearing house for use in areas where the environmental hygiene is highly prioritised, and where static electricity formed are easily discharged from the bearing house, resulting in a reduction in maintenance and a limitation or even avoiding deposit or accumulation of dirt, grime, microbial material, or allergens, on, in or around the bearing house and an extended lifetime of the bearing house and the bearing Thus, one aspect of the invention relates to a bearing house comprising a bearing house body for holding a bearing; a shield forming a shaft insertion for inserting a shaft into the bearing house, and at least one conducting element providing an electrical connection between the inside of the bearing house body to an outside material.

DETAILED DESCRIPTION OF THE INVENTION

FIG. 1

Figure 1:
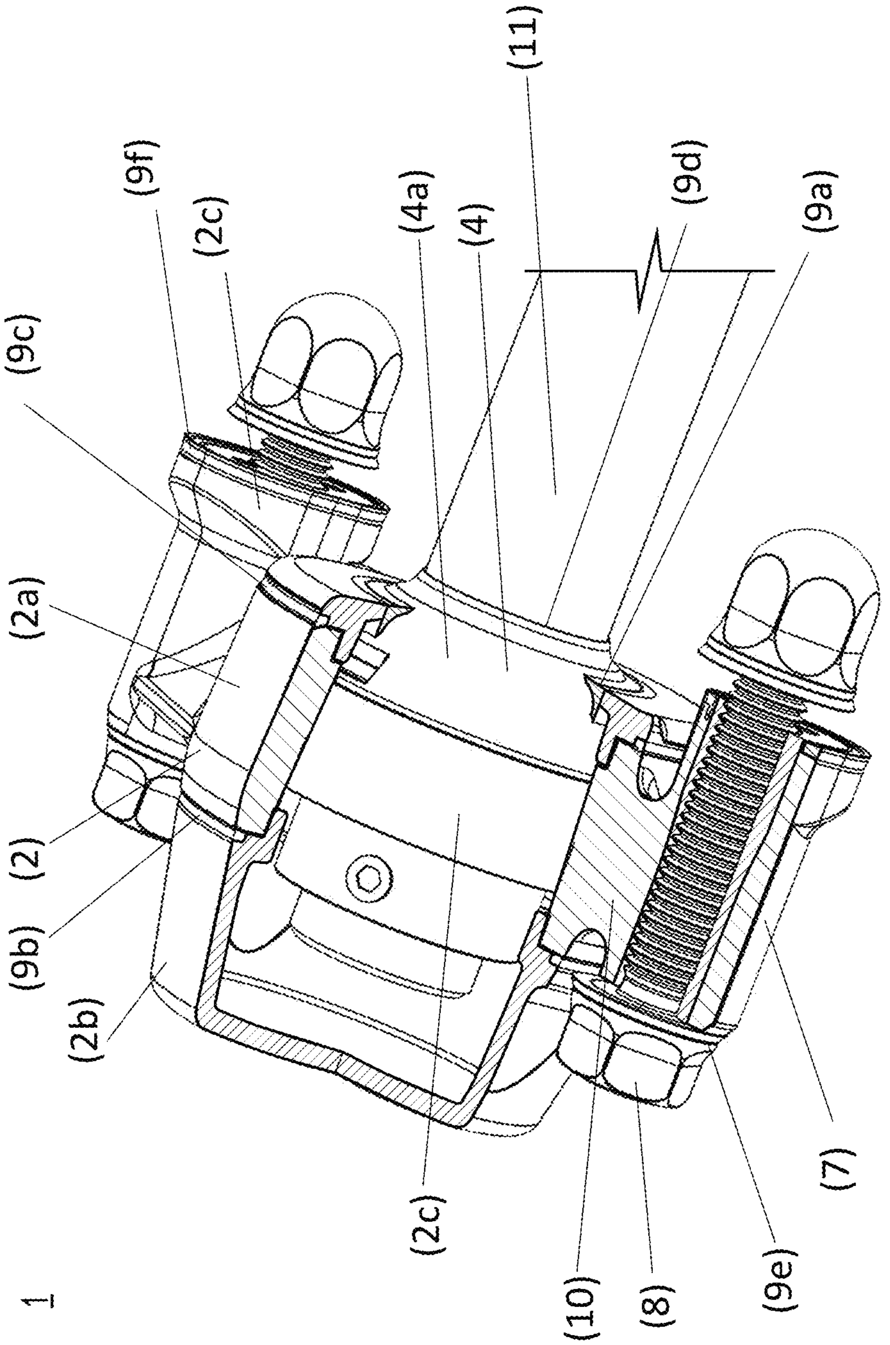
FIG. 1 shows a hygienic bearing house comprising a bearing body for holding a bearing.

FIG. 1 shows a hygienic bearing house (1) comprising a bearing body (2) for holding a bearing (3); and a shield (4) forming a shaft insertion (6) for inserting a shaft into the bearing house (1), the shield (4) is formed with a spherical outer surface (4*a*) which is movable in contact with the bearing house body (2) and the shield (4) rests on the bearing (3) when installed in the bearing house body (2). The shield (4) comprises a seal (9*a*) between the bearing house body (2) and the shield (4).

The spherical structure of the outside surface of the shield may be in contact with a removable flat cover (2*c*) which is attached to a fixed bearing house body (2*a*). When a bearing (3) is installed in the bearing house body (2) the removable flat cover (2*c*) presses the shield (4) against the bearing (3). The removable flat cover (2*c*) is in contact with the shield (4) and a sealing (9*a*) is provide between the removable flat cover (2*c*) (or the bearing house body (2)) and the shield (4). The removable flat cover (2*c*) also comprise a seal (9*c*) between the removable flat cover (2*c*) and the fixed bearing house body (2*a*).

On the opposite side of the removable flat cover (2*c*) a removable bearing house cover (2*b*) is attached to the fixed bearing house body (2*a*). A seal (9*b*) is provided between the fixed bearing house body (2*a*) and the removable bearing house cover (2*b*).

FIG. 1 shows a bearing house (1) having a closed end with a bearing house cover (2*b*). However, if the shaft passes through the bearing house, a shield construction according to the invention as described above may be arranged on each side of the bearing house body (2*a*).

Preferably, one or more sealings (9) introduced into the bearing house (1) are configured with contours, which are adapted to the surfaces of the bearing house and thereby substantially ensure continuous surfaces. Preferably, one or more of the sealings (9*a*), (9*b*), (9*c*), (9*d*), (9*e*), and/or (9*f*) are configured with contours, which are adapted to the surfaces of the bearing house and thereby substantially ensure continuous surfaces of the bearing house (1).

The shield (4) rests on the bearing (3) and the combined bearing (3) and the shield (4) may form a spherical structure, e.g. forming a spherical sealing, such as a ball or a half-ball like structure having the same spherical centre. The combined bearing (3) and the shield (4) is movable in contact with the bearing house body (2) and the shaft (11) is capable of angular movement. around the spherical centre of the shield (4) following a movement around a structure like a cone starting from the spherical centre. In addition to the angular movement of the shaft (11) when inserted into the bearing house (1), the shaft (11) may perform a rotation movement. The rotation movement may be performed around a longitudinal direction of the shaft or around the centreline of the shaft, starting from the spherical centre.

Misalignments that may cause angular movement of the shaft (11); the shield (4) and/or the bearing (3), may be caused by an angular misalignment of connected bearing houses and/or a parallel misalignment of connected bearing houses.

In the construction shown in FIG. 1, the shaft (11) (and the shield (4) and/or the shield (4) and the bearing (3)) is capable of an angular movement of above 3.5 degrees or more; in the range of 3.5-17 degrees, without stressing the bearing or inducing undesirable deformation of the sealings, whereby the bearing and the bearing house is kept waterproof.

The bearing house body (2) comprises two or more bearing house feet (7), for attaching the bearing house (1) to a base (5) using attachment means (8), such as bolts and nuts. The bearing house is attached to the base by bolt and nuts and in the joint between the bolt and the feet and the nut and the feet a sealing (9*e*) is provided. Each of the bearing house feet (7) extends from the bearing house body (2) by the means of an arm (10).

FIG. 2

Figure 2:
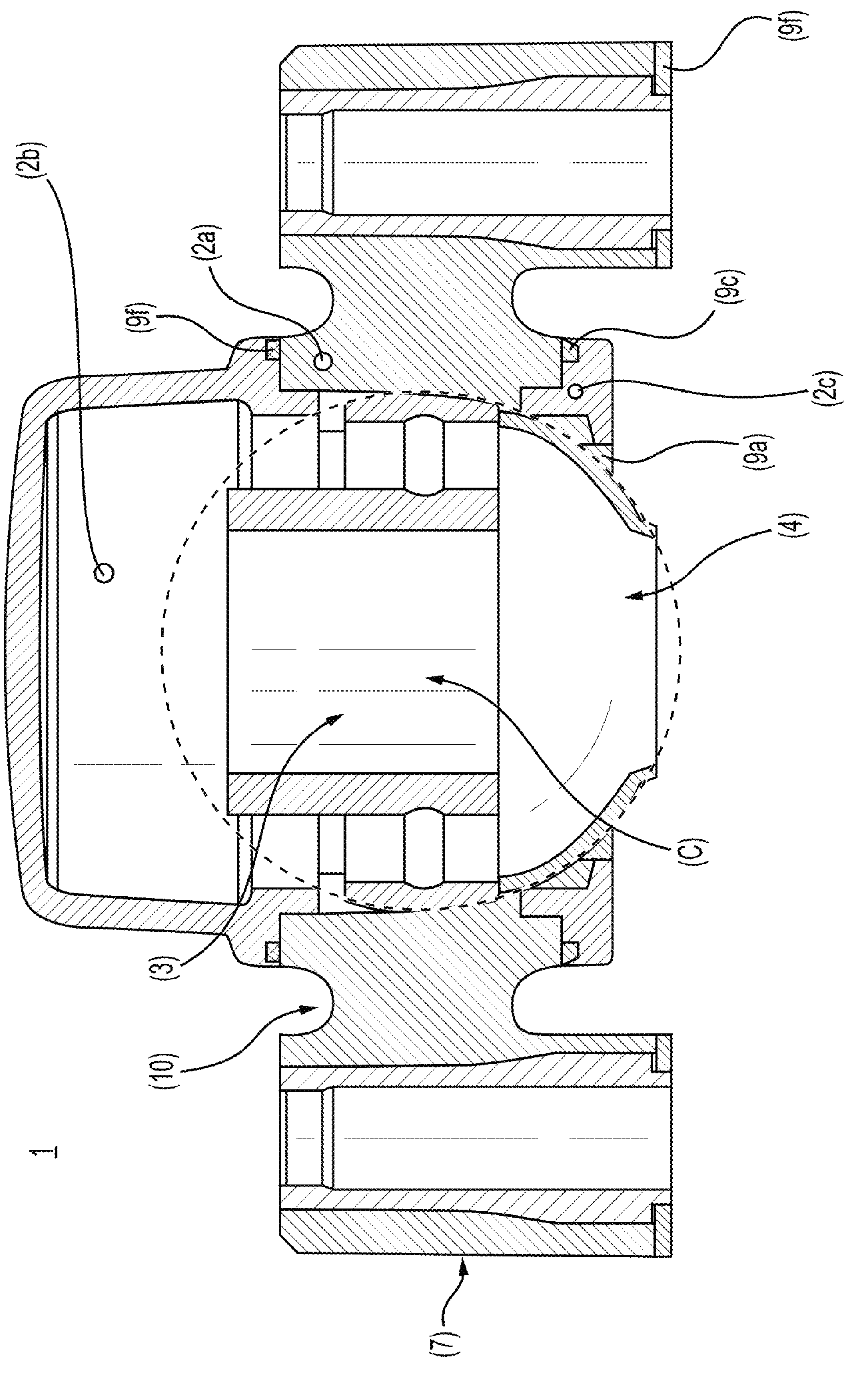
FIG. 2 shows a cross-section figure of the hygienic bearing house according to the present invention.

FIG. 2 shows a cross-section figure of the hygienic bearing house (1) according to the present invention. The hygienic bearing house (1) comprising a bearing body (2) for holding a bearing (3); and a shield (4) forming a shaft insertion (6) for inserting a shaft into the bearing house (1). The bearing house (1) is provided with two bearing house feet (7) which extends from the bearing house body (2) by the means of a arm (10). The bearing house body comprises a fixed bearing house body (2*a*), a removable bearing house cover (2*b*); and a removable bearing house flat cover (2*c*).

The removable bearing house flat cover (2*c*) presses the shield (4) against the bearing (3) when coupled to the fixed bearing house body (2*a*). The shield (4) is in combination with the bearing (3) forming a spherical structure, a two-dimensional structure of this has been illustrated in FIG. 2 by the solid circle.

When the shield (4) rests on the bearing (3) a spherical structure, such as a ball or a half-ball like structure, may be formed having the same spherical centre—the spherical centre (c). The shaft (not shown in FIG. 2) is, when inserted into the bearing house (1), capable of angular movement around the spherical centre (c). The angular movement around the spherical centre (c) may in the direction of a cone starting from the spherical centre (c) and around a longitudinal direction of the shaft or around the centreline of the shaft, starting from the spherical centre (c) and out of the bearing house (1).

The shaft (and the shield (4) and the bearing (3)) is capable of an angular movement of above 3.5 degrees or more; preferably in the range of 3.5-17 degrees, without stressing the bearing or inducing undesirable deformation of the sealings, whereby the bearing (2) and the bearing house body (2) is kept waterproof.

FIGS. 3-5

Figure 3A:
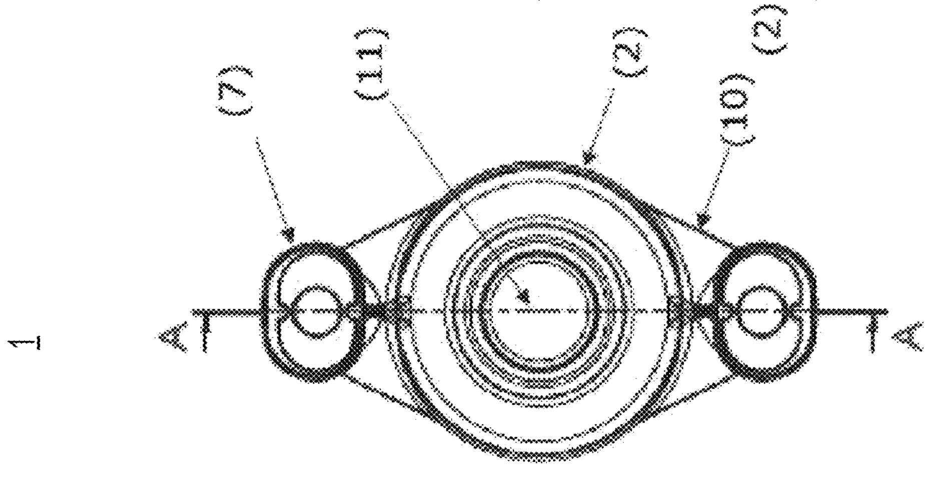
FIGS. 3, 4, and 5 show the effects achieved by the bearing house according to the present invention.
Figure 3B:
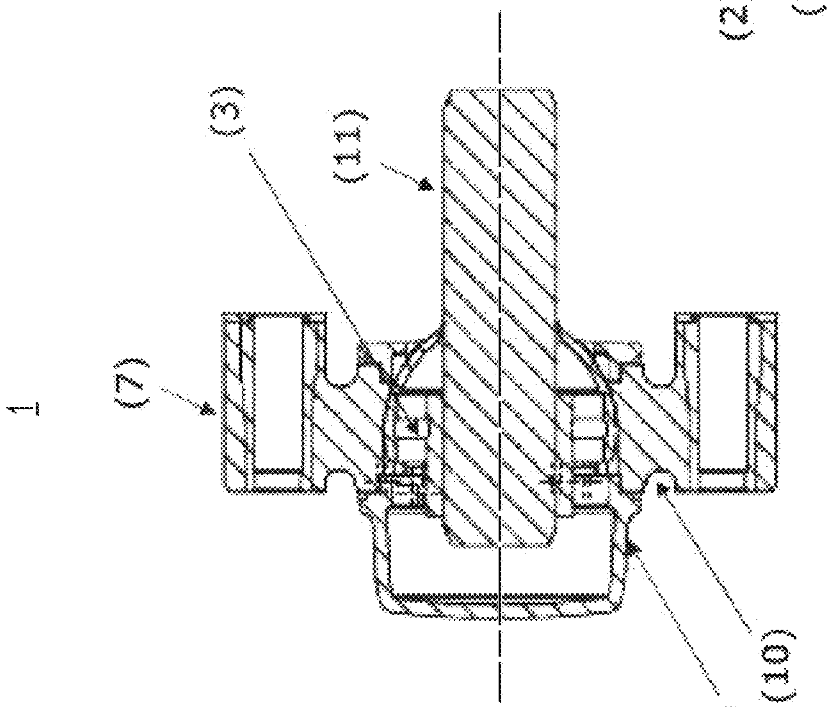
Figure 3C:
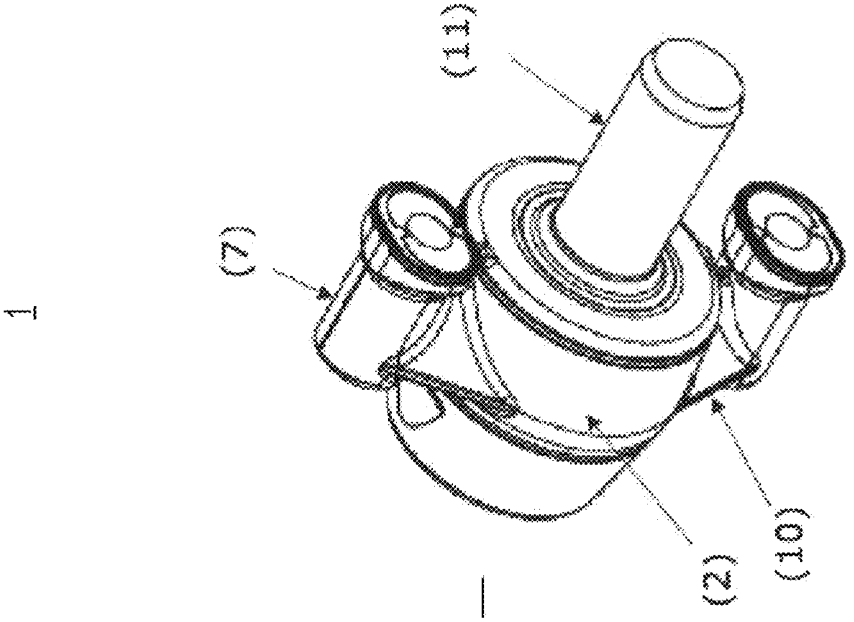
Figure 4A:
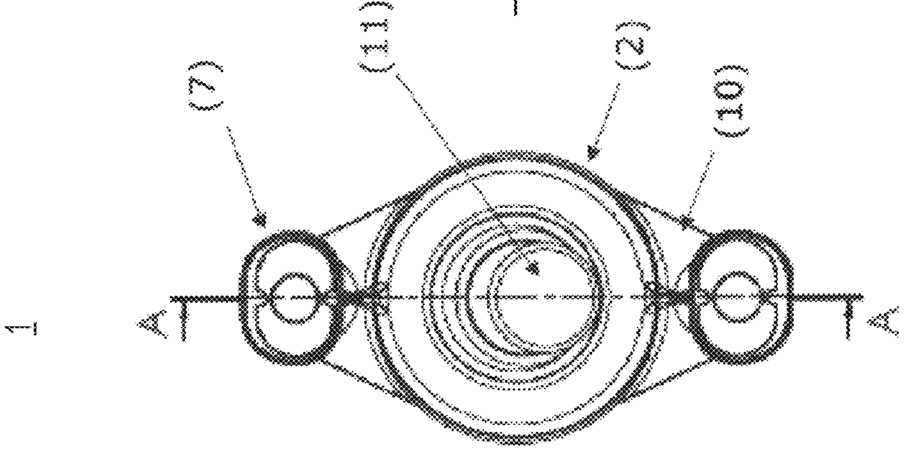
Figure 4B:
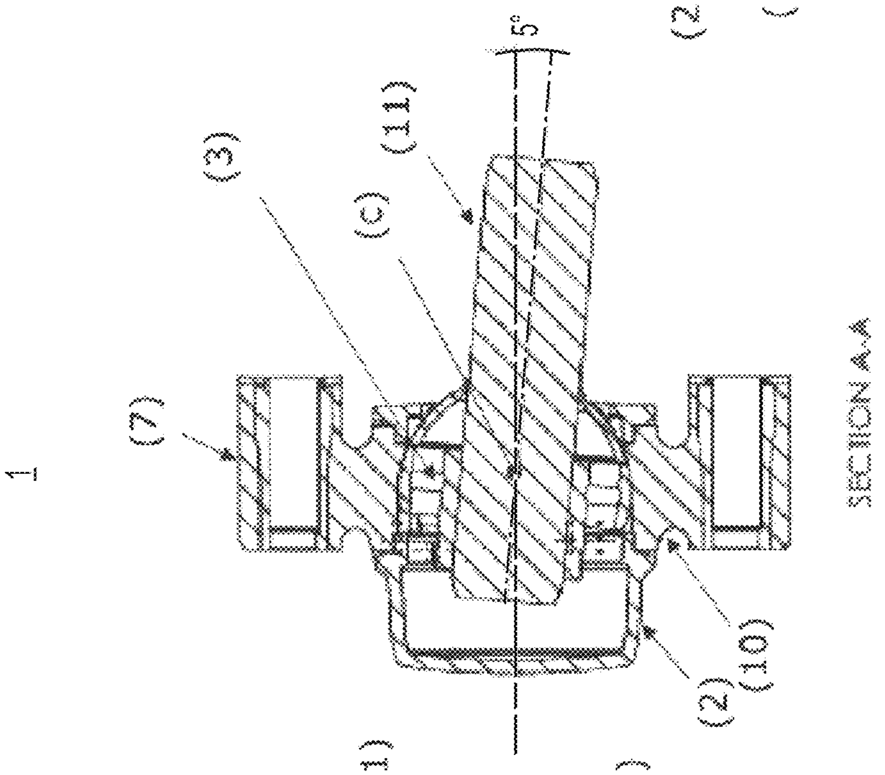
Figure 4C:
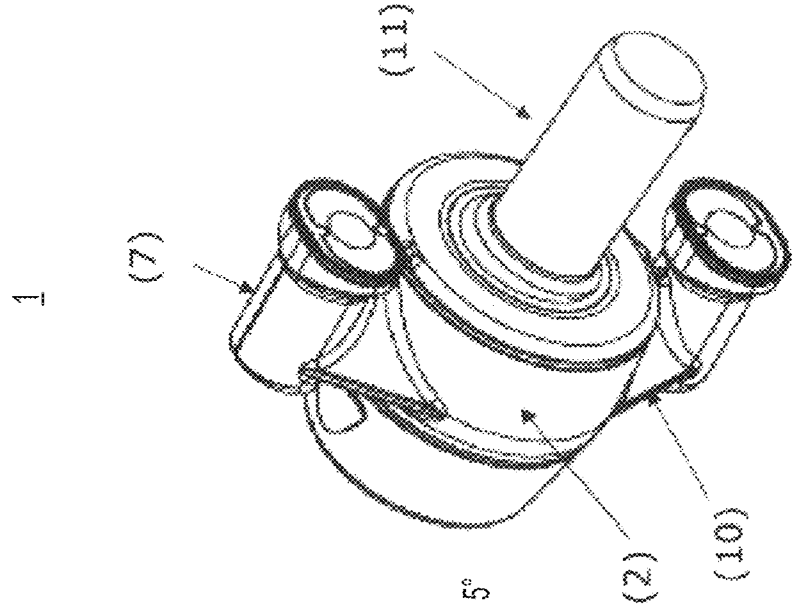
Figure 5A:
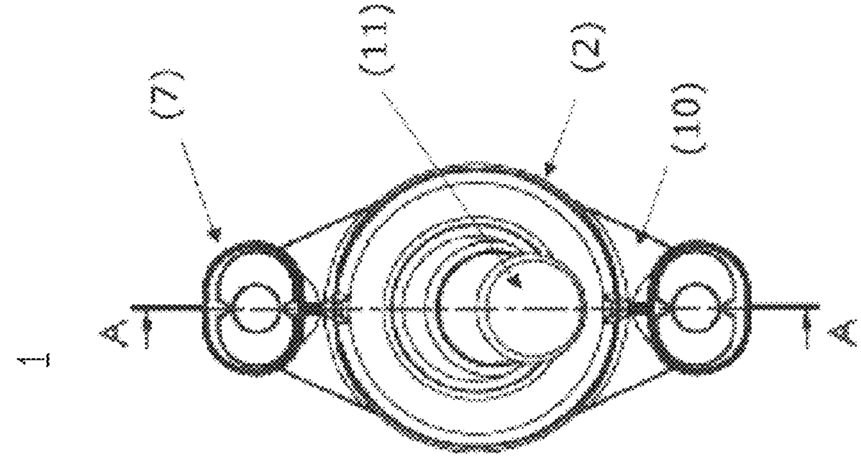
Figure 5B:
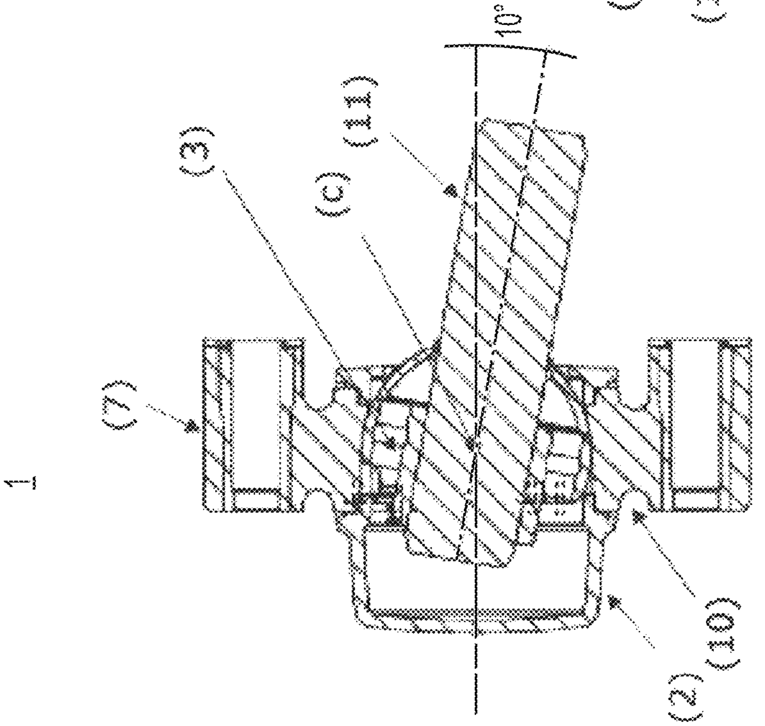
Figure 5C:
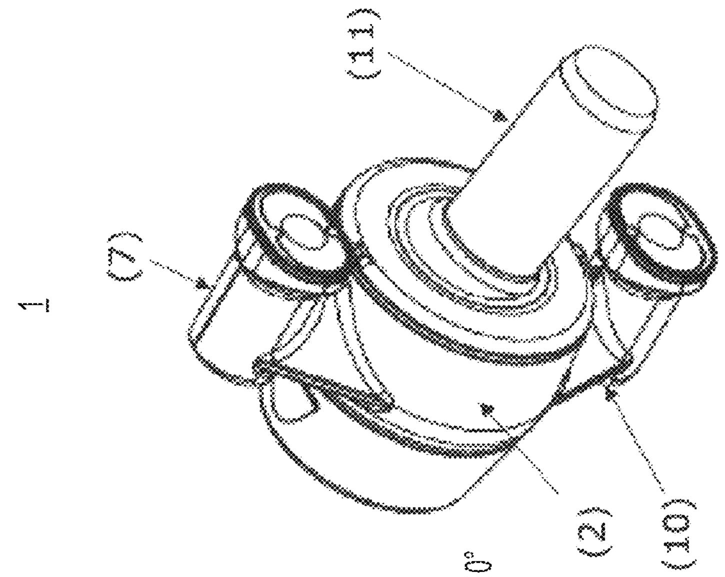

FIGS. 3-5 show the effects achieved by the bearing house (1) according to the present invention. The bearing houses (1) shown in FIGS. 3, 4, and 5 are the same as shown in FIGS. 1 and 2, wherein the angular movement around the spherical centre (c) has been shown. FIG. 3 shows not angular movement (0°), FIG. 4 shows 5 degrees angular movement (5°); and FIG. 5 shows 10 degrees angular movement (10°).

FIG. 6

FIG. 6 shows the backside of 4 different variations of a hygienic bearing house (1) according to the present invention defined by FIG. 6a, FIG. 6b, FIG. 6c, and FIG. 6d. The bearing house (1) comprises a bearing house body (2) for receiving a rotating shaft (not shown in FIG. 6), and two or more bearing house feet (7) for attaching the bearing house (1) to a base. Each of the two or more bearing house feet (7) extends from the bearing house body (2) by the means of a arm (10).

Figure 6B:
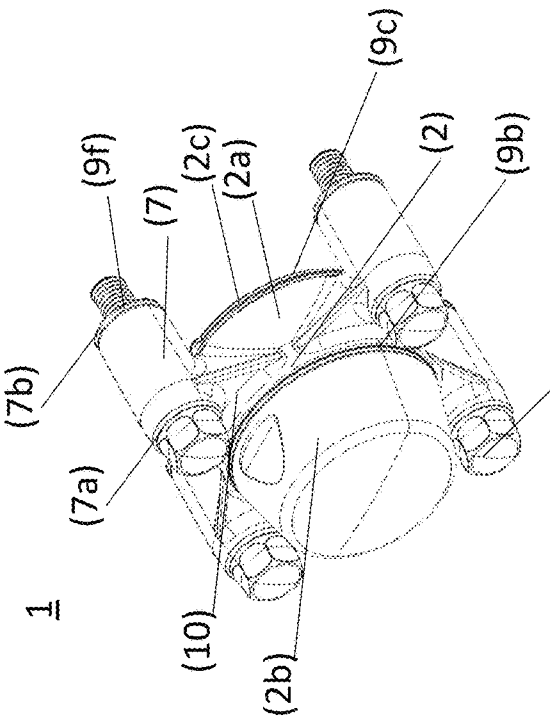
FIGS. 6*a*, 6*b*, and 6*c* show bearing house feet that are symmetrically distributed around the bearing house base.
Figure 6D:
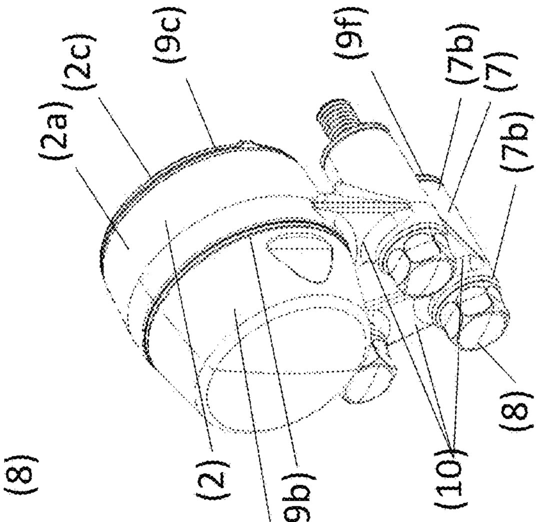
FIG. 6*d* shows a bearing house where the three bearing house feet are asymmetrically distributed around the bearing house base.
Figure 6A:
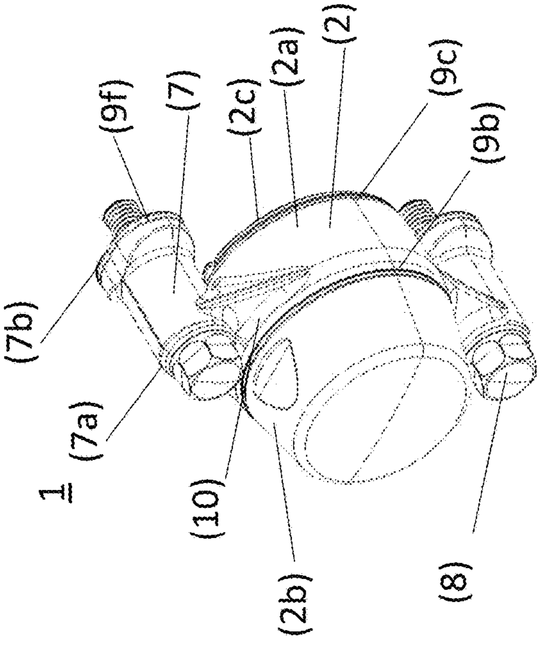

FIG. 6a shows a bearing house (1) comprising two bearing house feet (7). The two bearing house feet (7) are orientated in the longitudinal direction relative to the direction of a rotating shaft to be inserted into the bearing house (1). FIG. 6b shows a bearing house (1) comprising 4 bearing house feet (7). The 4 bearing house feet (7) are orientated in the longitudinal direction relative to the direction of a rotating shaft to be inserted into the bearing house (1). FIG. 1C shows a bearing house (1) comprising two bearing house feet (7). The two bearing house feet (7) are orientated in the perpendicular direction relative to the direction of a rotating shaft to be inserted into the bearing house (1). Figure id shows a bearing house (1) comprising three bearing house feet (7). The three bearing house feet (7) are orientated in the longitudinal direction relative to the direction of a rotating shaft to be inserted into the bearing house (1).

Figure 6C:
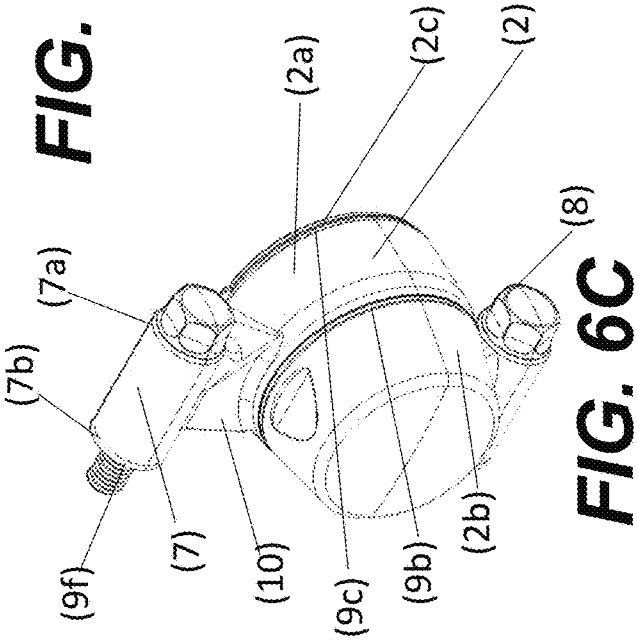

FIGS. 6a, 6b, and 6c show bearing house feet (7) that are symmetrically distributed around the bearing house base (2). FIG. 6d shows a bearing house (1) comprising three bearing house feet (7) where the three bearing house feet (7) are asymmetrically distributed around the bearing house base (2) and one bearing house foot (7) is to attached to the bearing house body (2) via one or more other bearing house foot (7). Preferably a circular connection of bearing house feet (7) may be provided, see FIG. 6d.

It is shown in the FIG. 6 that the bearing house feet (7) has a length which is larger (determined from the top of the bearing feet (7a) to the base end of the bearing feet (7b)) than the height of the arm (10). Actually, the bearing house feet (7) are the only parts of the bearing house which is in contact with the base when the bearing house (1) is attached to the base. As the bearing house base (2) and the arm (10) are not in contact with the base when attached to the base the open space created between the bearing house body (2) (and the arm (10)) and the base (when attached to the base) allows for easy access for cleaning the bearing house from all angles.

The bearing house body (2) comprises a fixed bearing house body (2a) connected, via the arm (10), with the two bearing house feet (7) (FIGS. 6a and 6c), the three bearing house feet (7) (FIG. 6d), or the 4 bearing house feet (7) (FIG. 6b), and a removable bearing house cover (2b) which is attached to the fixed bearing house body (2a). On the opposite site of the fixed bearing house body (2a) and relative to the removable bearing house cover (2b) of, a removable flat cover (2c) is provided. The removable flat cover (2c) comprises a shaft insertion (not shown).

Between the fixed bearing house body (2a) and the removable flat cover (2c) and between the fixed bearing house body (2a) and the removable bearing house cover (2b) a seal ((9c) and (9b) respectively) is inserted to ensure that water does not enter the bearing house (1) in these joints. The sealings (9) are configured with contours which are adapted to the structure of the surfaces connected or elements connected and thereby substantially ensure a continuous or substantially continuous surface in the joints between surfaces or elements connected, resulting in that dirt, grime, microbial material (such as bacteria or fungus), or other fouling materials (e.g. allergens), may be hindered or prevented from hiding and/or accumulating.

A seal (9f) is also provided in the base end of each of the bearing house feet (7b) to avoid accumulation of dirt, grime, microbial material, or other fouling materials in the joint between the bearing house body (2) and the base.

The seals (9) may be prepared from a non-conductive soft silicone material. With a blue color, RAL 5010, which provides an improved visual inspection of the hygienic level and/or cleaning quality.

The sealings (9) according to the present invention assist in providing a bearing house being waterproof by blocking entering of water, dirt and microbial activity.

The bearing house feet (7) comprises attachment means (8), such as bolts and nuts for attaching the bearing house (1) to the base.

The bearing house (1) may be made of a sturdy polypropylene material and the surface of the bearing house (1) is made smooth to allow drainage of water from the surface. The surface of the bearing house (1) has a roughness below Ra 2.0 μm; such as Ra 1.8 μm; e.g. Ra 1.6 μm; such as Ra 1.4 μm; e.g. Ra 1.2 μm; such as Ra 1.0 μm; e.g. Ra 0.8 μm; such as Ra 0.6 μm; e.g. Ra 0.4 μm.

Inside the bearing house (1) a bearing suitable for receiving a rotating shaft is installed. The bearing may be a ceramic bearing or a stainless-steel bearing.

FIG. 7

Figure 7:
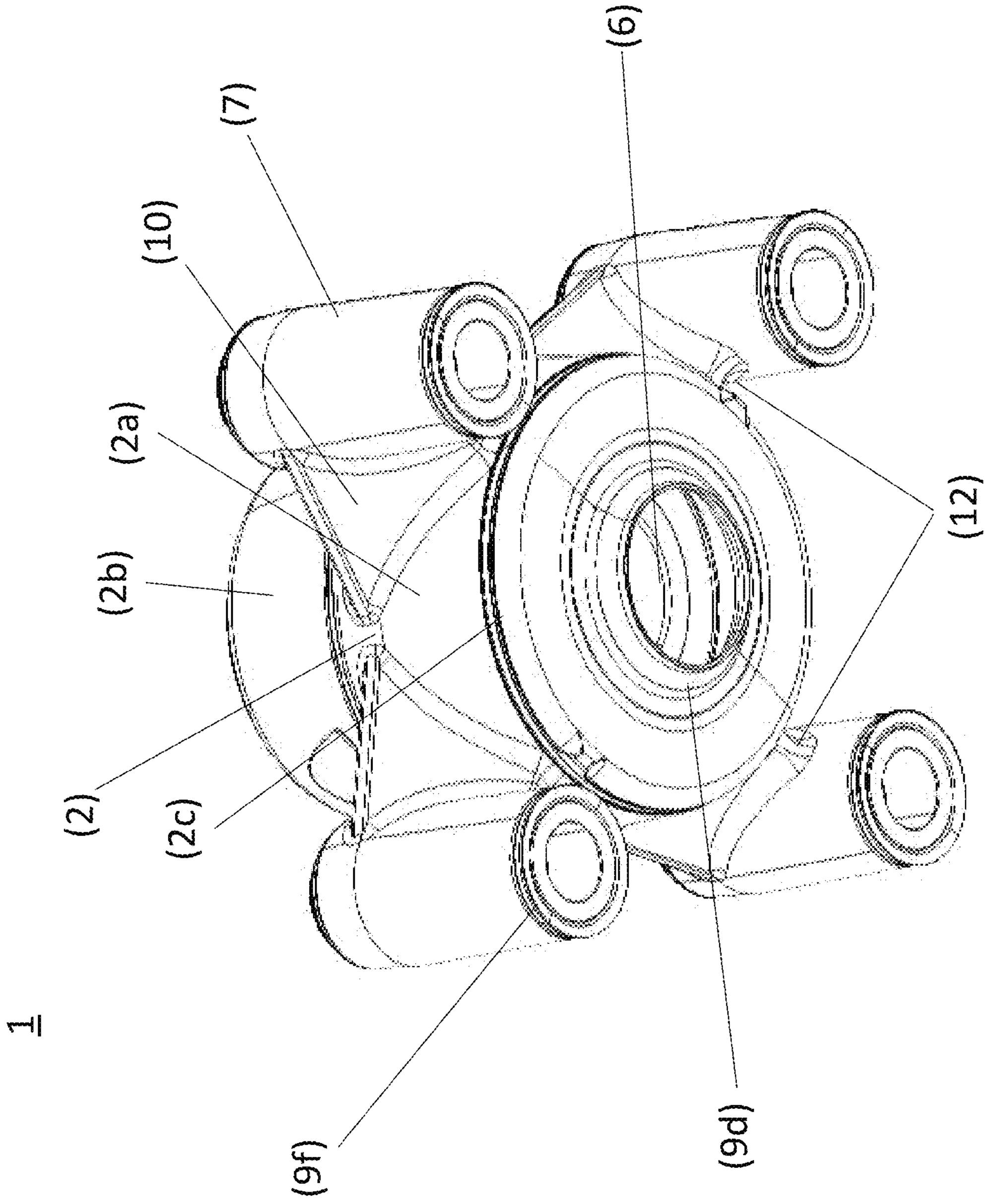
FIG. 7 shows the front side of a hygienic bearing house according to the present invention.

FIG. 7 shows the front side of a hygienic bearing house (1) according to the present invention. The bearing house (1) comprises a bearing house body (2) for receiving a rotating shaft (not shown), and 4 bearing house feet (7) for attaching the bearing house (1) to a base. Each of the bearing house feet (7) extends from the bearing house body (2) by the means of a arm (10).

At the base end of the bearing feet (7b), which are the only parts of the bearing house which is in contact with the base when the bearing house (1) is attached to the base, a sealing (9f) is provided.

The bearing house body (2) comprises:

- a fixed bearing house body (2a) connected, via the arm (10), with two bearing house feet (7); and
- a removable flat cover (2c) comprising a shaft insertion (6).

Inside the bearing house base (2) a bearing is installed to suitable for receiving a rotating shaft, and a sealing (9d) is provided which may be in contact with the shaft when the shaft is inserted into the bearing house body (2). The sealing (9d) and the spherical outer surface (4) may be the same material and preferably in one piece, or the sealing (9d) and the spherical outer surface (4) may be different materials. Preferably, the sealing (9d) and the spherical outer surface (4) may be the same material and preferably in one piece.

The arm (10) is formed as a polyhedron, in particular as a triangular prism. The first end of the two triangular ends is attached to the bearing house body (2) and the second end of the two triangular parts is attached to one of the two bearing house feet (7). The first triangular end has a curative end having a radius relative to the radius of the bearing house body (2) which is larger than the radius of the curative end attached to each of the bearing house feet (7).

The arm (10) has a length (1) determining how far each of the bearing house feet (7) extends from the bearing house body (2); a height (h) determined in the direction from the bearing house (1) to the base and a width (w) determined in the direction perpendicular to the direction from the bearing house (1) to the base.

The arm (10) is formed as an integrated part of the fixed bearing house body (2*a*) and the two bearing house feet (7) during moulding.

The arm (10) is not in contact with the base when the bearing house (1) is attached to the base.

The tip (12) of the arm (10) which is formed as a polyhedron, in particular as a triangular prism, is pointing towards the base. This structure of the arm (10) improves cleaning around the bearing house with improved access for cleaning from all sides and angles of the bearing house, and improved drainage of water.

FIG. 8

Figure 8:
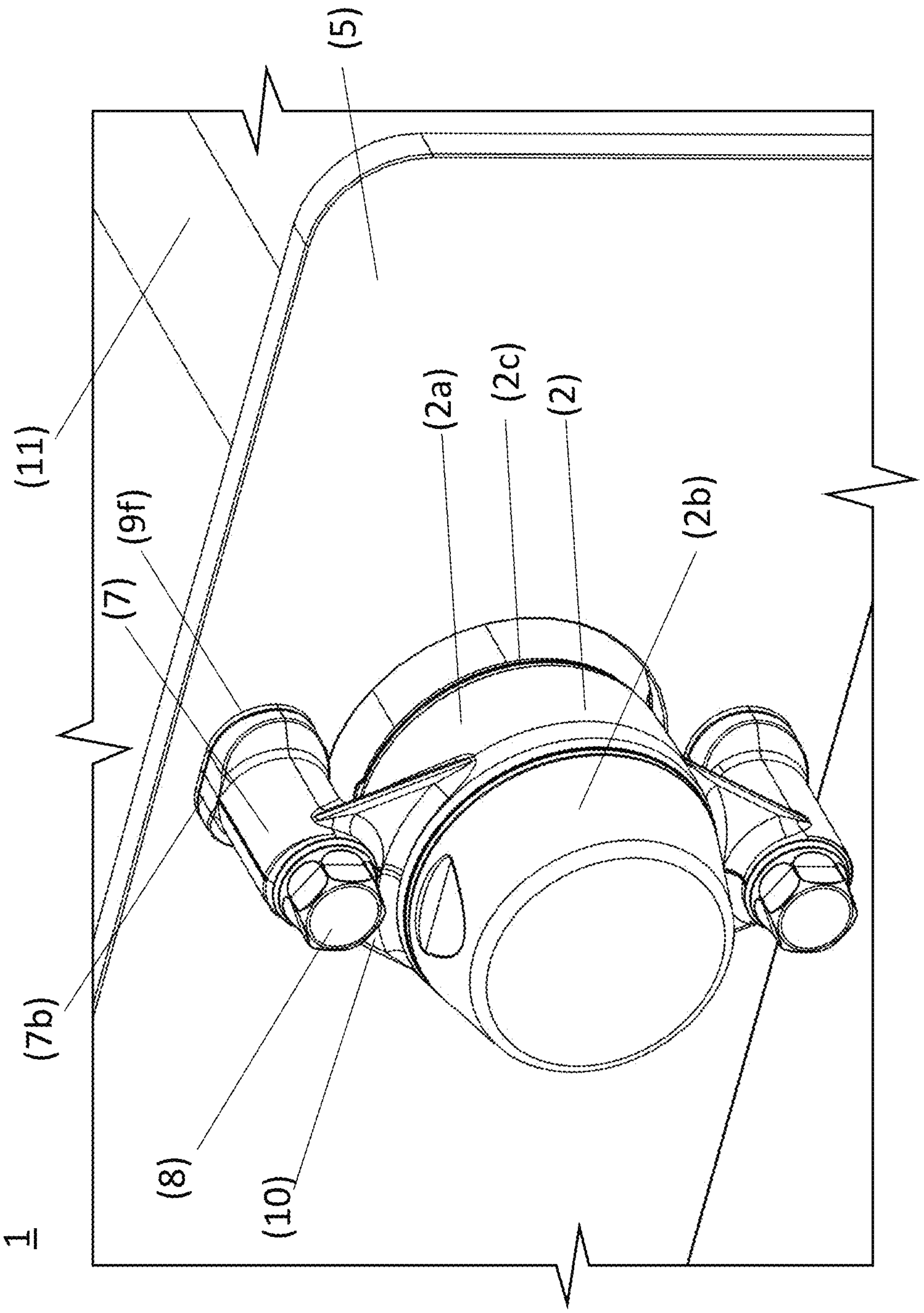
FIG. 8 shows a hygienic bearing house according to the present invention.

FIG. 8 shows a hygienic bearing house (1) according to the present invention. The bearing house (1) comprises a bearing house body (2) for receiving a rotating shaft (11), and 4 bearing house feet (7) for attaching the bearing house (1) to a base. Each of the four bearing house feet (7) extends from the bearing house body (2) by the means of a arm (10).

The bearing house body (2) comprises a fixed bearing house body (2*a*), a removable bearing house cover (2*b*); and a removable flat cover (2*c*) comprising a shaft insertion for inserting the shaft (11).

In an embodiment of the present invention the bearing house body (2) may comprise a fixed bearing house body (2*a*), a removable bearing house cover (2*b*); and a removable flat cover (2*c*), wherein the removable flat cover (2*c*) comprising a shaft insertion for inserting the shaft (11) and wherein the removable bearing house cover (2*b*) comprising a shaft insertion (6) for inserting the shaft (11). Such construction of the bearing house according to the present invention may be provided for bearing houses where the shaft goes through the bearing house and thus two shaft insertions (6) are needed, one shaft insertions (6) for entering the shaft (11) into the bearing house (1) and one for exiting the shaft (11) from the bearing house (1).

The bearing house (1) according to the present invention is attached using attachment means (8), such as bolts, to a base (5) at the base end of the bearing feet (7*b*), which are the only parts of the bearing house which is in contact with the base (5) when the bearing house (1) is attached to the base a sealing (9*f*) is provided.

The bearing house body (2) comprises:

a fixed bearing house body (2*a*) connected, via the arm (10), with two bearing house feet (7); and a removable flat cover (2*c*) comprising a shaft insertion.

FIG. 9

Figure 9:
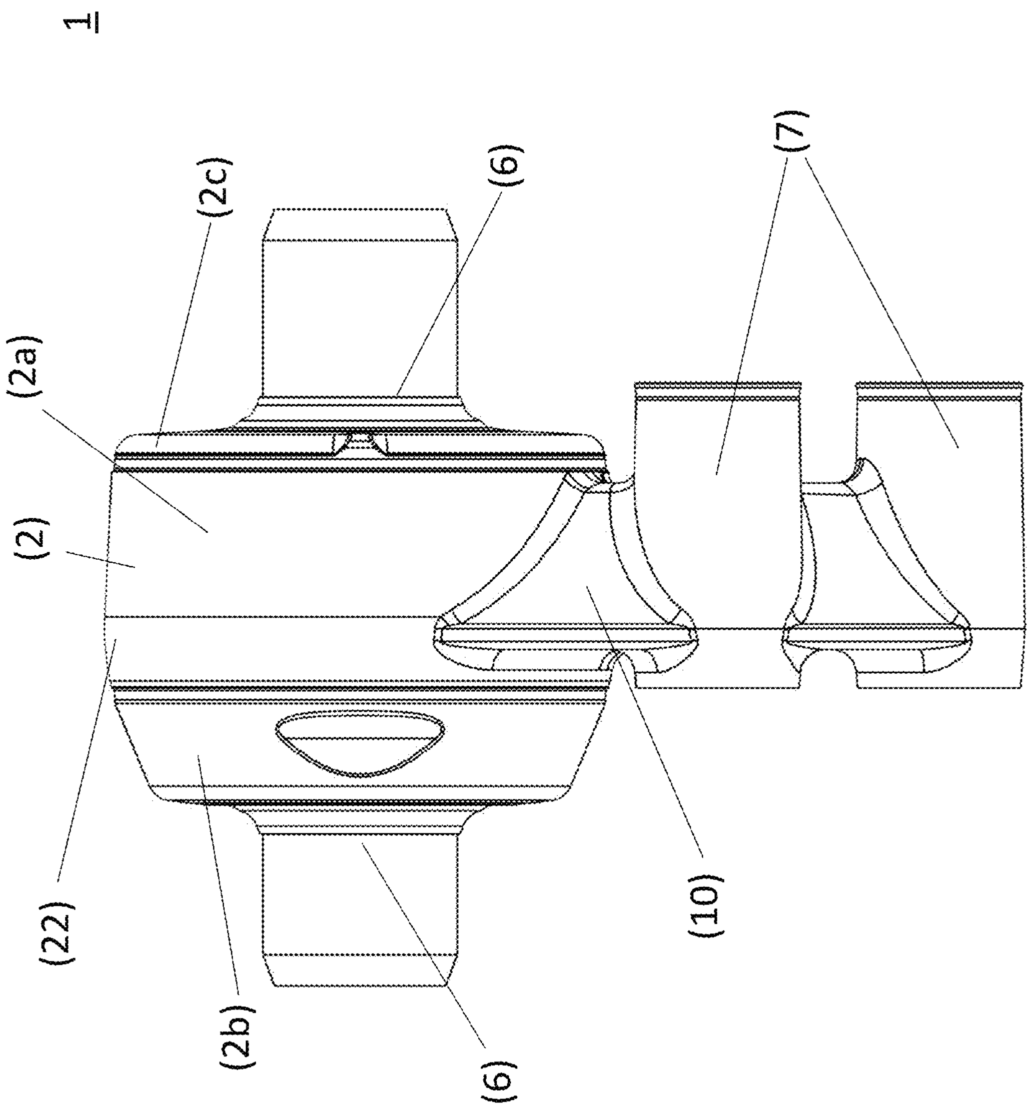
FIG. 9 shows a hygienic bearing house according to the present invention.

FIG. 9 shows a hygienic bearing house (1) according to the present invention. The bearing house (1) comprises a bearing house body (2) for holding a rotating shaft (11), and 4 bearing house feet (7) for attaching the bearing house (1) to a base. Each of the four bearing house feet (7) extends from the bearing house body (2) by the means of an arm (10).

The bearing house body (2) may comprise a fixed bearing house body (2*a*), a removable bearing house cover (2*b*); and a removable flat cover (2*c*), wherein the removable flat cover (2*c*) comprising a shaft insertion for inserting the shaft (11) and wherein the removable bearing house cover (2*b*) comprising a shaft insertion (6) for inserting the shaft (11).

Such construction of the bearing house (1) as shown in FIG. 9 according to the present invention may be provided for bearing houses where the shaft goes through the bearing house and thus are provided with two shaft insertions (6), one shaft insertions (6) for entering the shaft (11) into the bearing house (1) and one for exiting the shaft (11) from the bearing house (1).

FIG. 10

Figure 10:
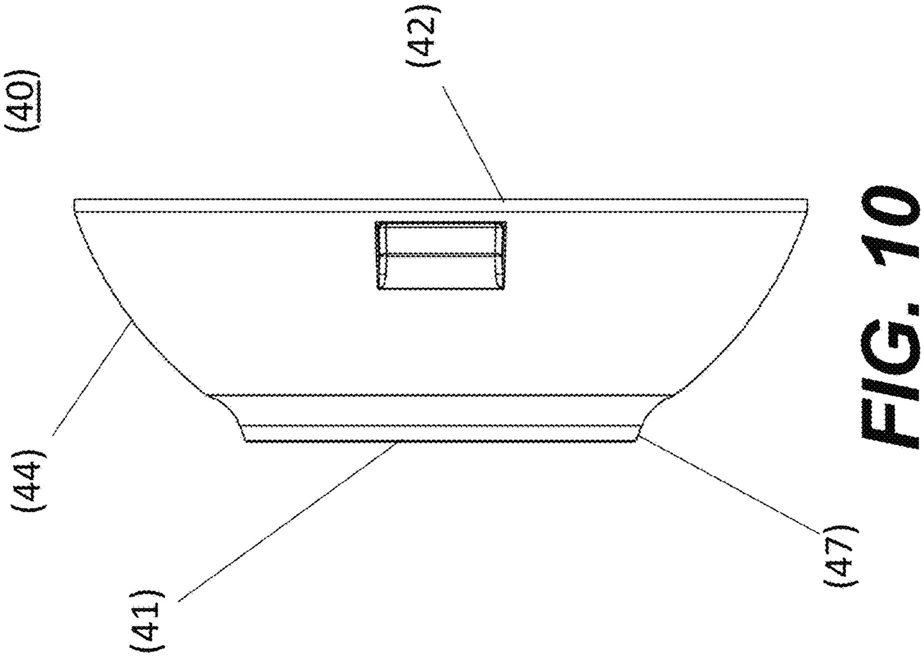
FIG. 10 shows a side-view of the sleeve according to the present invention.

FIG. 10 shows a side-view of the sleeve (40) according to the present invention. The sleeve (40) comprise a circular front-end (41) and a circular back-end (42), and a circular opening (6) going through a centre of the circular front-end (41) and the circular back-end (42) wherein the circular back-end (42) is connected to the circular front-end (41) by a spherical structure (44). The circular opening (6) may be going through the sleeve (40), from the circular front-end (41) to the circular back-end (42).

The sleeve (40) may be a slide bearing and/or a seal, such as a spherical seal. The sleeve (40) may be provided in a one-piece material.

The sleeve (40) comprises a diameter of the circular front-end (41) may be smaller than a diameter of the circular back-end (42).

The circular front-end (41) may have a front-end circular opening (45) and the circular back-end (42) may have a back-end circular opening (46), wherein the diameter of the front-end circular opening (45) may be smaller than the back-end circular opening (46).

The front-end circular opening (45) may be provided with a lip seal (47). The lip seal (47) may have a negative or neutral, curvature construction (48), relative to the sleeve (40). The negative, or neutral, curvature construction (48) provided by the lip seal (47) may be negative curvature relative to the spherical structure (44). The negative, or neutral, curvature construction (48) forms a lip seal 47) parallel, or substantially parallel, to the longitudinal direction of a shaft (11, FIG. 11 or 12) when inserted into the circular opening (49), acting as a shaft insertion (6) for inserting a shaft into the bearing house (1).

FIG. 11

Figure 11:
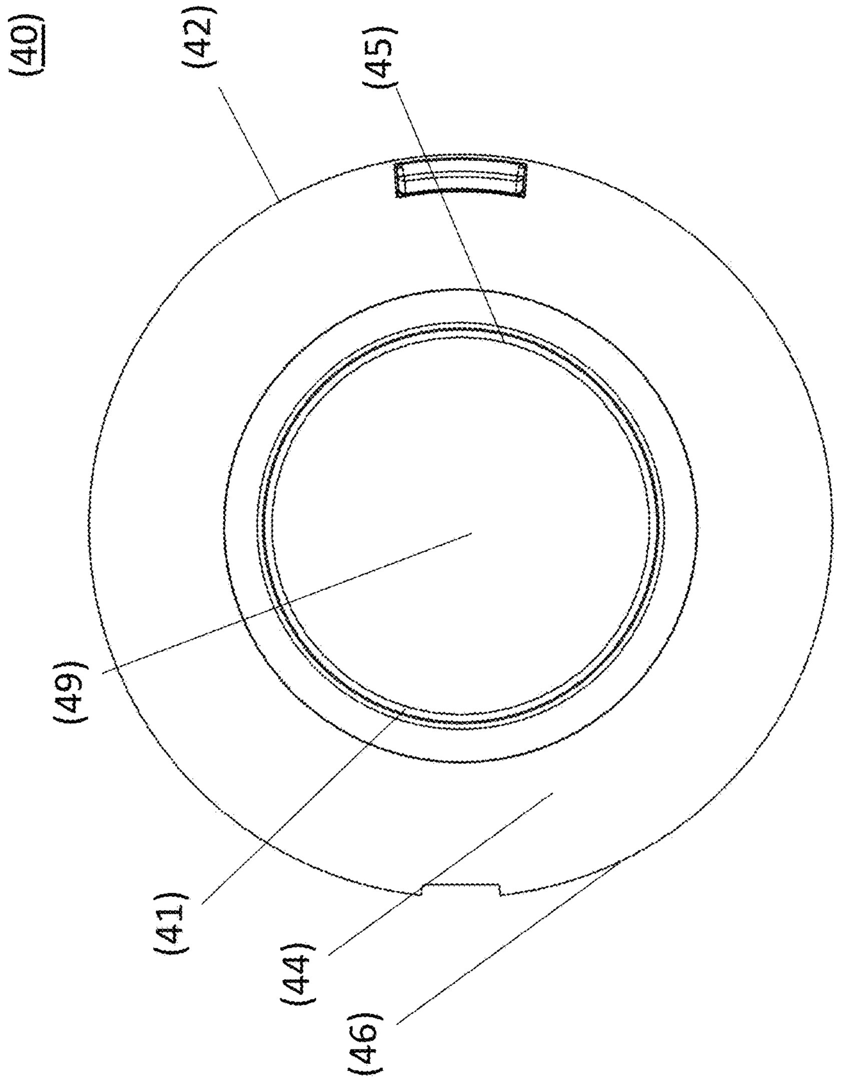
FIG. 11 shows a front-view of the sleeve as shown in FIG. 10.

FIG. 11 shows a front-view of the sleeve (40) as shown in FIG. 10. The sleeve (40) comprises a circular front-end (41) and a circular back-end (42), and a circular opening (49) going through a centre of the circular front-end (41) and the circular back-end (42) wherein the circular back-end (42) is connected to the circular front-end (41) by a spherical structure (44). The circular opening (49) may be going through the sleeve (40), from the circular front-end (41) to the circular back-end (42).

The circular front-end (41) may have a front-end circular opening (45) and the circular back-end (42) may have a back-end circular opening (46), wherein the diameter of the front-end circular opening (45) may be smaller than the back-end circular opening (46).

FIG. 12

Figure 12:
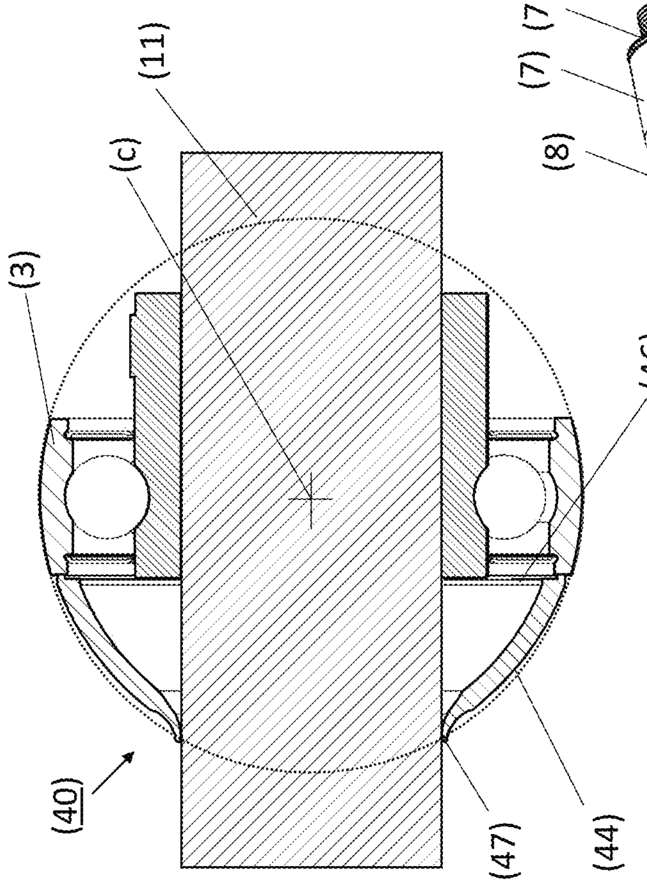
FIG. 12 shows the interaction between the sleeve, the shaft, and the bearing.

FIG. 12 shows the interaction between the sleeve (40), the shaft (11) and the bearing (3). The sleeve (40) comprises a circular front-end (41) and a circular back-end (42), and a circular opening (49) going through a centre of the circular front-end (41) and the circular back-end (42) wherein the circular back-end (42) is connected to the circular front-end (41) by a spherical structure (44). The circular opening (49) may be going through the sleeve (40), from the circular front-end (41) to the circular back-end (42) and a shaft 11 is inserted herein. The FIG. 11 shows that the sleeve (40) rests on the bearing (3) and together the sleeve (40) and the bearing (3) may form a spherical ball or a spherical half-ball with a common spherical centre.

FIG. 13

Figure 13:
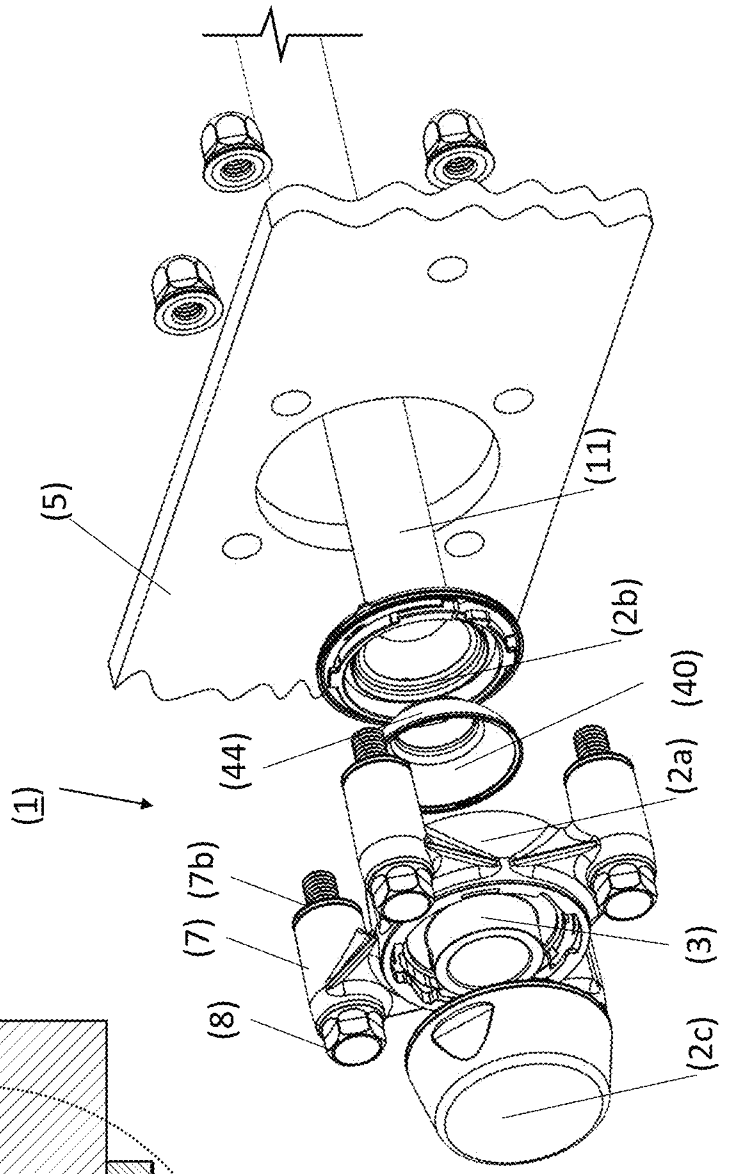
FIG. 13 shows an explosion view of the hygienic bearing house according to the present invention comprising a sleeve.

FIG. 13 shows an explosion view of the hygienic bearing house (1) according to the present invention comprising a sleeve (40).

The hygienic bearing house (1) comprising a bearing body (2) for holding a bearing (3); and a sleeve (40) forming a shaft insertion (6) (provided by the circular opening (49))

for inserting a shaft (11) into the bearing house (1), the sleeve (40) is formed with a circular front-end, having a front-end circular opening (45) and a circular back-end having a back-end circular opening (46) forming a circular opening (49) going through a centre of the circular front-end and the circular back-end and the diameter of the front-end circular opening (45) may be smaller than the back-end circular opening (46). The sleeve (40) is movable in contact with the bearing house body (2) and the sleeve (40) rests on the bearing (3) when installed in the bearing house body (2). The sleeve (40) may be a seal between the bearing house body (2) and the shaft (11) and a slide bearing against the shaft (11).

The spherical structure (44) of the outside surface of the sleeve (40) may be in contact with a removable flat cover (2*c*) which is attached to a fixed bearing house body (2*a*). When a bearing (3) is installed in the bearing house body (2) the removable flat cover (2*c*) presses the sleeve (40) against the bearing (3).

The sleeve (40) rests on the bearing (3) and the combined bearing (3) and the sleeve (40) may form a spherical structure, such as a ball or a half-ball like structure having the same spherical centre. The combined bearing (3) and the sleeve (40) is movable in contact with the bearing house body (2) and the shaft (11) is capable of angular movement. around the spherical centre of the sleeve (40) following a movement around a structure like a cone starting from the spherical centre. In addition to the angular movement of the shaft (11) when inserted into the bearing house (1), the shaft (11) may perform a rotation movement. The rotation movement may be performed around a longitudinal direction of the shaft or around the centreline of the shaft, starting from the spherical centre.

The bearing house (1) according to the present invention is attached using attachment means (8), such as bolts, to a base (5) at the base end of the bearing feet (7*b*), which are the only parts of the bearing house which is in contact with the base (5) when the bearing house (1) is attached to the base (5).

FIG. 14

Figure 14:
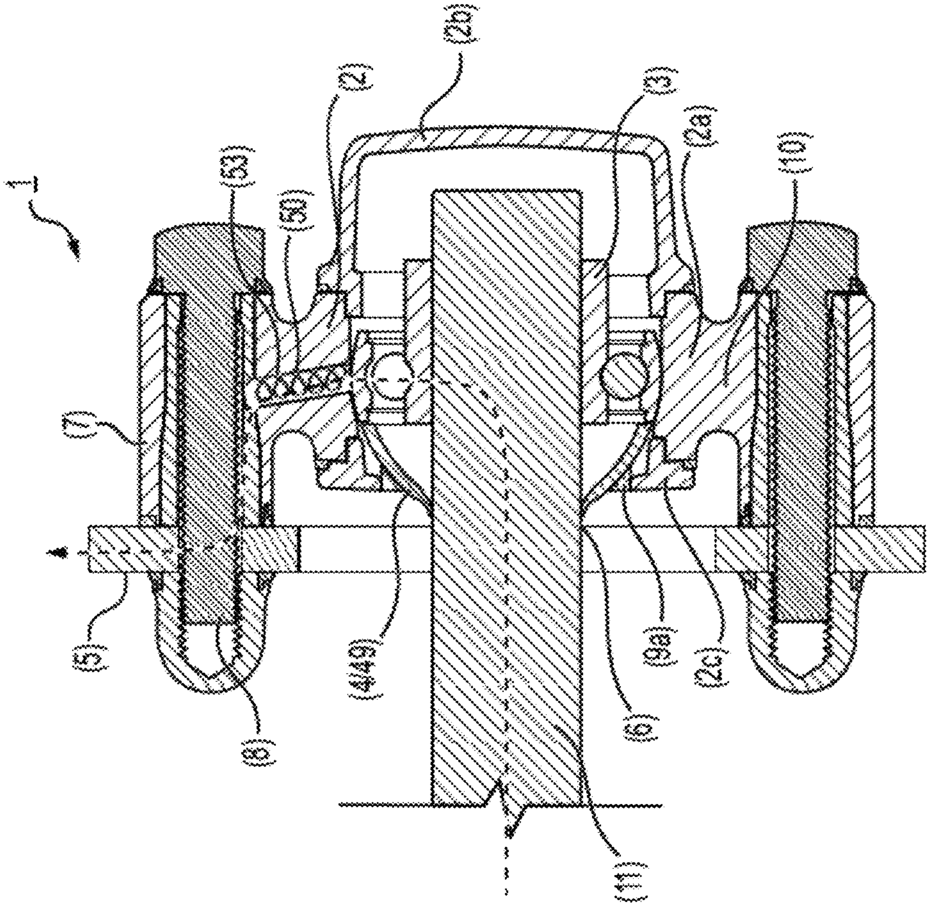
FIG. 14 shows a hygienic bearing house according to the present invention.

FIG. 14 shows a hygienic bearing house (1) according to the present invention. The bearing house (1) comprises a bearing house body (2) for holding a bearing (3); a shield (4) forming a shaft insertion (6) for inserting a rotating shaft (11) into the bearing house (1), and at least one conducting element (50) providing an electrical connection between the inside of the bearing house body (2) to an outside material.

FIG. 14 show that an electrical connection going through the hole (53) is configured to transfer the static electricity created on the surface of the rotatable shaft (11), through the bearing (3), when the rotatable shaft (11) and the bearing (3) may be inserted into the bearing house (1), and through the at least one conducting element (50) to the outside material, e.g. the base (5) on which the bearing house may be attached.

The bearing house comprises 2 bearing house feet (7) for attaching the bearing house (1) to a base (5) using attachment means (8). Each of the 2 bearing house feet (7) extends from the bearing house body (2) by the means of a arm (10).

The shield (4) is formed with a spherical outer surface (4*a*) which is movable in contact with the bearing house body (2) and the shield (4) rests on the bearing (3) when installed in the bearing house body (2). The shield (4) comprises a seal (9*a*) between the bearing house body (2) and the shield (4).

The spherical structure of the outside surface of the shield may be in contact with a removable flat cover (2*c*) which is attached to a fixed bearing house body (2*a*). When a bearing (3) is installed in the bearing house body (2) the removable flat cover (2*c*) presses the shield (4) against the bearing (3). The removable flat cover (2*c*) is in contact with the shield (4) and a sealing (9*a*) is provide between the removable flat cover (2*c*) (or the bearing house body (2)) and the shield (4). The removable flat cover (2*c*) also comprise a seal (9*c*) between the removable flat cover (2*c*) and the fixed bearing house body (2*a*).

The bearing house body (2) comprises a fixed bearing house body (2*a*), a removable bearing house cover (2*b*); and a removable flat cover (2*c*) comprising a shaft insertion for inserting the shaft (11).

Static electricity be transported on the surface of the rotating shaft as well as being generated during rotation of the shaft (11) the bearing (3) as described herein and to discharge the static electricity the present invention is provided with at least one conducting element (50) providing an electrical connection between the inside of the bearing house body (2) to an outside material, such as the base (5). Discharge of the static electricity may be provided via the at least one bearing house feet (7) and/or the at least one attachment means (8) and the flow of the static electricity during discharge may be illustrated by the dashed winding arrow in FIG. 14.

FIG. 15

Figure 15:
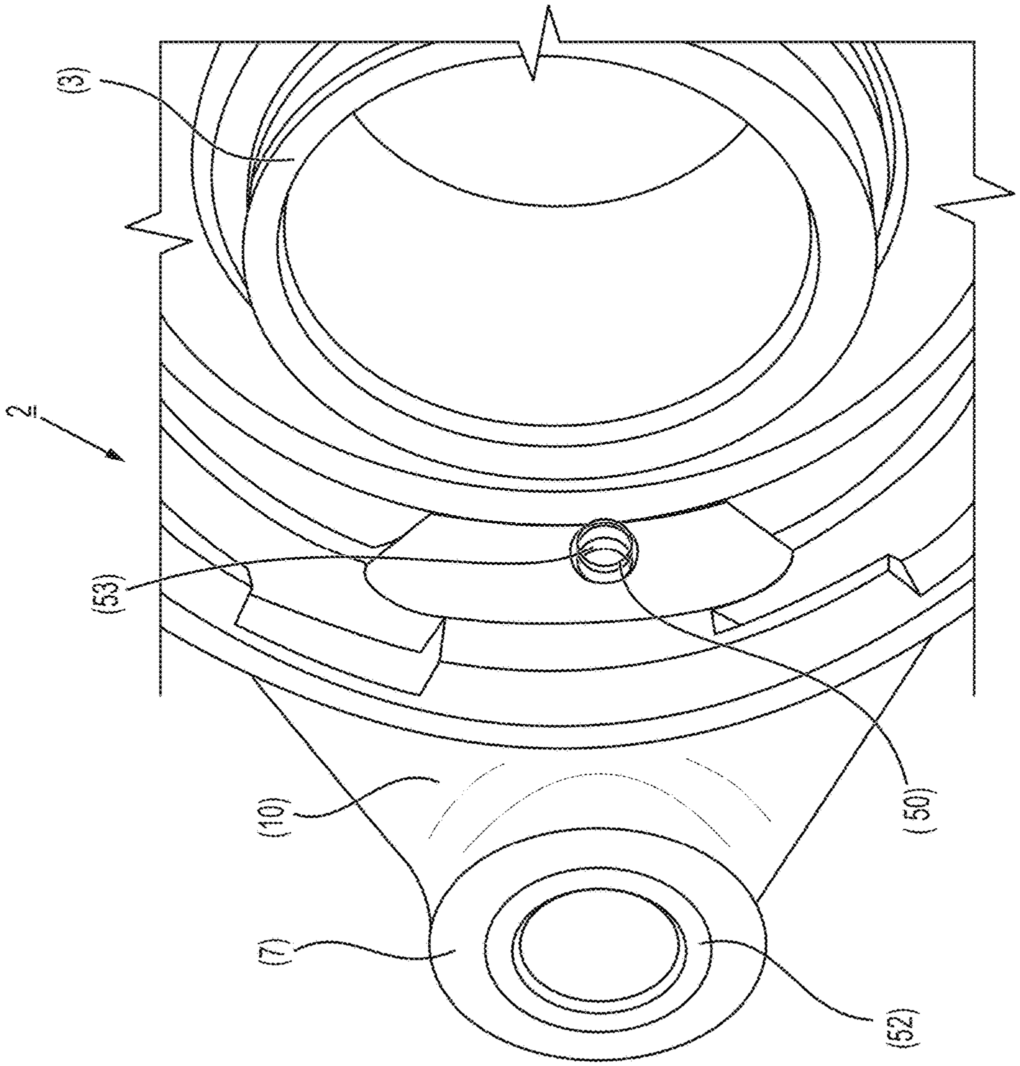
FIG. 15 shows a bearing house body according to the present invention having an bearing house foot extended form the bearing house body by an arm.

FIG. 15 shows a bearing house body (2) according to the present invention having an bearing house foot (7) extended form the bearing house body (2) by an arm (10). The bearing house foot (7) are shown to have a metal core (52) which may be suitable for receiving the static electricity from the inside of the bearing house body (2), preferably from the bearing (3).

The static electricity may be transferred from the inside of the bearing house body (2) to the outside of the bearing house by at least one conducting element (50) which is formed by a spring and which is in movable physical contact with the stationary part of the bearing (3).

The static electricity discharged from the inside of the bearing house body (2) may be transferred from the inside of the inside of the bearing house body (2) to the at least one conducting element (50) through the hole (53) in the bearing house body (2) through the arm (10) into the bearing house foot (7) and to the metal core (52) of the bearing house foot (7). From the metal core (52) the static electricity may be transferred to the attachment means and into the base (5) releasing the static electricity.

By only making the hole (53) from the inside of the bearing house body to the metal core (52) of the at least one feet (7) of the bearing house the high hygienic standard of the bearing house may be maintained since the hole (53) or the conducting element (50) does not provide any openings for deposits or accumulation of dirt, grime, microbial material and not negative effects on the cleaning.

The present invention will now be described in more detail in the following.

Hygienic bearing houses used in a hygienic environment, such as a food production site, a feed production site or a pharmaceutical site, where dirt, grime, microbial material (such as bacteria or fungus), or other fouling materials, such as allergens, may hide and accumulate resulting in contaminated products with undesirable components and static electricity may form which may be challenging to equipment, the bearing and the bearing house and discharging this static electricity, preferably without compromising the hygienic effect of the bearing house may be a problem.

Accordingly, the inventors of the present invention surprisingly found that simplifying and rebuilding the bearing house by ensuring it being waterproof, even at increased angular movements when misaligned during installation, cleaning on and around the bearing house may be much easier and the incidence of deposits or accumulation of dirt, grime, microbial material, or allergens, on, in or around the bearing house, may be significantly reduced or even avoided, and at the same time without compromising strength, robustness or stability of the bearing house and ensuring proper discharging under hygienic conditions and fulfilling the regulations in the US and EU.

Thus, a preferred aspect of the present invention relates to a bearing house comprising a bearing house body for holding a bearing, and at least one conducting element providing an electrical connection between the inside of the bearing house body and an outside material.

A further preferred aspect of the present invention relates to a bearing house comprising a bearing house body for holding a bearing, a shield forming a shaft insertion for inserting a shaft into the bearing house, and at least one conducting element providing an electrical connection between the inside of the bearing house body and an outside material.

Preferably, the outside material may be a material different from the bearing house; different from the bearing, as inserted into the bearing house; or different from the shaft when inserted into the bearing and the bearing house. The effect of the at least one conducting elements may be of particular relevance when the bearing house body may be provided in a non-conductive material.

In an embodiment of the present invention the electrical connection may be configured to transfer static electricity through the bearing, when the bearing may be inserted into the bearing house, through the at least one conducting element to the outside material.

In a further embodiment of the present invention the electrical connection may be configured to transfer static electricity from a rotatable shaft (when inserted into the bearing house, through the bearing, when the bearing may be inserted into the bearing house, and through the at least one conducting element to the outside material.

When the bearing house provided with a bearing may be installed with rotatable shaft installed in the bearing/the bearing house, electrical current, such as static electricity, may travel from the rotatable shaft through the bearing to the at least one conducting element to the outside material.

Preferably, the non-conductive material may be a polymeric material, e.g. a plastic material or a ceramic material.

In an embodiment of the present invention the at least one conducting element may comprise an electrically conductive material.

The electrically conductive material or the conductive elements may be made of a metal material, preferably an electrically conductive metal material.

In an embodiment of the present invention the metal material may be selected from gold, cupper or steel.

In a further embodiment of the present invention the electrically conductive material may be a springy conducting material. The springy conducting material may be in the form of a spring (e.g. a spiral spring or plate spring), a flexible tap, pogo pins or the like.

Preferably, the at least one conducting element may be in physical contact with the bearing when the bearing is inserted into the bearing house.

The at least one conducting element may preferably be in movable physical contact with the bearing when the bearing is inserted into the bearing house. Preferably, the at least one conducting element may be the movable part.

In an embodiment of the present invention, the at least one conducting element may be in physical contact with the static part of the bearing when the bearing is inserted into the bearing house In a further embodiment of the present invention the electrical connection may be connected to one or more bearing house feet and/or one or more attachment means providing an electrically connection from the inside of the bearing house body to the outside material.

In this case the electrically connection from the inside of the bearing house body (2) to the outside material may be provided by the conductive elements via the one or more bearing house feet and/or one or more attachment means.

In an embodiment of the present invention the bearing house body comprises a shield forming a shaft insertion for inserting a shaft into the bearing house wherein the shield may be formed with a spherical outer surface which is movable in contact with the bearing house body and the shield rests on the bearing when installed in the bearing house body.

The spherical outer surface of the shield may allow angular movement of the shaft and the bearing without the conducting element loses the physical contact with the bearing.

In an embodiment of the present invention the bearing house body may be provided with at least one hole between the inside of the bearing house body and the outside material, or the inside of the bearing house body and the one or more bearing house feet and/or one or more attachment means.

The hole allows an easy electrical connection between bearing and the outside material, optionally via the one or more bearing house feet and/or one or more attachment means.

In an embodiment of the present invention the outside material may be any material or surface capable of receiving the static electricity created in the bearing.

Preferably, the material or surface capable of receiving the static electricity created in the bearing may be the surface on which the bearing house may be attached.

By making the hole from the inside of the bearing house body to a metal core of the at least one feet of the bearing house, the high hygienic standard of the bearing house may be maintained and may not be jeopardized, since the hole or the conducting element does not provide any openings for deposits or accumulation of dirt, grime, microbial material and not negative effects on the cleaning.

A preferred embodiment of the present invention relates to a bearing house comprising a bearing body for holding a bearing; and a shield forming a shaft insertion for inserting a shaft into the bearing house, the shield is formed with a spherical outer surface which is movable in contact with the bearing house body and the shield rests on the bearing when installed in the bearing house body.

The spherical form of the shield may encircle the shaft insertion.

In an embodiment of the present invention the shield may comprise a sleeve according to the present invention.

In a further embodiment of the present invention the shield and/or the sleeve forms a shell around the shaft. Preferably, the shell according to the present invention is a hollow shell.

The hollow shell according to the present invention preferably, provides an empty space between the shield and/or the sleeve and the shaft. In an embodiment of the present invention the shell, in particular the hollow shell, does not comprise a solid construction (where there has been made room for only the shaft to be introduced).

The inventor of the present invention found that by applying a shield and/or a sleeve in the form of a hollow shell a resilient effect of the shield and/or the sleeve may be provided, in particular in the contact point between the shield and/or the sleeve and the shaft, and more particular in the contact between the lip of the shield and/or the sleeve and the shaft. This resilient effect provides improved hygienic effect of the shield and/or the sleeve and the bearing house comprising the shield and/or the sleeve.

Furthermore, using a hollow shield and/or sleeve as described in the present invention, allows shaft to go through the bearing house, and/or allows the user to change the longitudinal orientation of the bearing and the shaft (by about 180°).

In an embodiment of the present invention the circular front-end has a radius which is smaller than a radius of the circular back-end. Preferably, the radius of the circular back-end is at least 10% larger than the circular front-end; e.g. the radius of the circular back-end is at least 20% larger than the circular front-end; such as the radius of the circular back-end is at least 30% larger than the circular front-end; e.g. the radius of the circular back-end is at least 40% larger than the circular front-end; such as the radius of the circular back-end is at least 50% larger than the circular front-end; e.g. the radius of the circular back-end is at least 60% larger than the circular front-end.

A preferred embodiment of the present invention relates to a sleeve comprising a circular front-end and a circular back-end, and a circular opening going through a centre of the circular front-end and the circular back-end wherein the back-end is connected to the front-end by a spherical structure.

The present invention relates to the use of a sleeve comprising a polymer material as a sealing and as a slide bearing. Preferably, the sealing may be a sleeve according to the present invention.

In an embodiment of the present invention the sleeve may be a slide bearing.

In yet an embodiment of the present invention the shield and/or the sleeve according to the present invention, may preferably be immobile relative to the rotating shaft. This means that the shield and/or the sleeve may not be rotating together with the rotating shaft, in particular the shield and/or the sleeve may not be rotating.

In a further embodiment of the present invention the sleeve may be a seal, preferably a spherical sleeve In an embodiment of the present invention the sleeve may be a seal, preferably a spherical sleeve, and a slide bearing.

The sleeve according to the present invention may preferably be provided in a one-piece material.

The circular opening may preferably be going through the sleeve, from the circular front-end to the circular back-end.

In an embodiment of the present invention the sleeve comprises a diameter of the circular front-end which may be smaller than a diameter of the circular back-end.

In an embodiment of the present invention the diameter of the circular front-end may be at least 10% smaller than the diameter of the circular back-end; such as at least 25% smaller; e.g. at least 30% smaller; such as at least 40% smaller; e.g. at least 45% smaller; such as at least 50% smaller; e.g. at least 55% smaller; such as at least 60% smaller; e.g. at least 70% smaller; such as at least 80% smaller; e.g. in the range of 10-80% smaller; such as in the range of 25-70% smaller; e.g. in the range of 40-60% smaller; such as in the range of 45-55% smaller.

The circular front-end may have a front-end circular opening and the circular back-end may have a back-end circular opening, wherein the diameter of the front-end circular opening may be smaller than the back-end circular opening.

In an embodiment of the present invention the front-end circular opening is provided with a lip seal.

The lip seal according to the present invention may preferably provide a resilient contact with a rotating shaft.

The lip seal may have a negative curvature construction or a neutral curvature construction relative to the sleeve.

Preferably, the negative curvature construction or the neutral curvature construction forms a lip seal from the end of the spherical structure and parallel, or substantially parallel, to the longitudinal direction of an shaft when inserted into the circular opening.

In an embodiment of the present invention the sleeve may comprise an organic compound.

In a further embodiment of the present invention the organic compound may comprise an inert organic compound.

The organic compound may be polymer material. Preferably the polymer material comprises an olefin compound. The olefin compound may be formed like a fiber compound.

Preferably the olefin compound may comprise polypropylene, polyethylene or a combination of polypropylene and polyethylene.

Preferably the sleeve comprises at least 10% organic compound; such as at least 20%; e.g. at least 30%; such as at least 40%; e.g. at least 50%; such as at least 75%; e.g. at least 80%; such as at least 90%; e.g. at least 95%.

The sleeve comprises less than 30% non-organic material; such as less than 20%; e.g. less than 10%; such as less than 5%; e.g. less than 3%; such as less than 1%.

Non-organic material may include metals, like steel, iron, silicate, or ceramics.

In an embodiment of the present invention the sleeve may comprise a Young modulus (or the modulus of elasticity in tension) in the range of 1000-1500 GPa; such as in the range of 1050-1400 GPa; e.g. in the range of 1100-1200 GPa; such as in the range of 1130-1170 GPa; e.g. in the range of 1140-1160 GPa.

If the Young modulus (or the modulus of elasticity in tension) becomes too low, such as below 1000 GPa, it may be difficult to maintain the shape of the sleeve. If the Young modulus (or the modulus of elasticity in tension) becomes too high, such as above 1500 GPa the desired elasticity of the sleeve may be lost.

Young modulus (or the modulus of elasticity in tension) may relate to a measure of the ability of a material to withstand changes in length when under lengthwise tension or compression In an embodiment of the present invention the sleeve may comprise a coefficient of thermal expansion below $20\times10^{-5}$ $K^{-1}$; such as $15\times10^{-5}$ $K^{-1}$ or below; e.g. below $13\times10^{-5}$ $K^{-1}$; such as $11\times10^{-5}$ $K^{-1}$ or below; e.g. below $10\times10^{-5}$ $K^{-1}$; such as $8\times10^{-5}$ $K^{-1}$ or below; e.g. below $6\times10^{-5}$ $K^{-1}$; such as in the range of $2\times10^{-5}$ $K^{-1}$-$20\times10^{-5}$ $K^{-1}$; e.g. in the range of $5\times10^{-5}$ $K^{-1}$-$18\times10^{-5}$ $K^{-1}$; such as in the range of $5\times10^{-5}$ $K^{-1}$-$15\times10^{-5}$ $K^{-1}$; e.g. in the range of $10\times10^{-5}$ $K^{-1}$-$12\times10^{-5}$ $K^{-1}$.

The coefficient of thermal expansion describes how the size of an object changes with a change in temperature. Specifically, it measures the fractional change in size per degree change in temperature at a constant pressure, such that lower coefficients describe lower propensity for change in size.

In an embodiment the sleeve comprises a moisture absorption less than 1% (w/w); such as less than 0.9% (w/w); e.g. less than 0.8% (w/w); such as less than 0.7% (w/w); e.g. less than 0.6% (w/w); such as less than 0.5% (w/w); e.g. less than 0.4% (w/w); such as less than 0.3% (w/w); e.g. less than 0.2% (w/w); such as less than 0.1% (w/w).

Moisture absorption as used in the present context relates to the capacity of the sleeve to absorb moisture from its environment. Absorbed moisture has been shown to act as a plasticizer, reducing the glass transition temperature and strength of plastic—which is a reversible effect.

In an embodiment of the present invention the sleeve (40) comprises a moisture absorption in the range of 0.01-1% (w/w); such as in the range of 0.02-0.9% (w/w); e.g. in the range of 0.03-0.8% (w/w); such as in the range of 0.04-0.7% (w/w); e.g. in the range of 0.05-0.6% (w/w); such as in the range of 0.06-0.5% (w/w); e.g. in the range of 0.07-0.4% (w/w); such as in the range of 0.08-0.3% (w/w); e.g. less than 0.09-0.2% (w/w); such about 0.1% (w/w)]

In a further embodiment of the present invention the sleeve comprises a max strain of at least 1%; such as at least 2%; e.g. at least 3%; such as at least 4%; e.g. at least 5%.

The max strain of the sleeve may relate to the maximum stress necessary in order to provide permanent or irreversible deformation of the sleeve.

In an embodiment of the present invention the sleeve may, when subjected to a constant stress resulting in a strain of 2%, at 20° C. for at most 6 hours, provide at most 50% extension relative to the stain of 2%, such as at most 30%; such as at most 25%; e.g. at most 20%. Preferably, the sleeve may within 7 days in relax from the stress applied resume to at most 1% extension relative to the stain of 2%, such as at most 0.75%; such as at most 0.5%; e.g. at most 0.25%.

Correct adjustment of the max stain may significantly influence and improve durability of the sleeve.

In an embodiment of the present invention the sleeve may comprise a coefficient of friction (determined against steel) in the range of 0.005-0.4, such as in the range of 0.01-0.3; e.g. in the range of 0.05-0.25; such as in the range of 0.075-0.2; e.g. in the range of 0.09-0.19.

Preferably, the sleeve comprises a coefficient of friction (determined against steel) which is below 0.4, such as below 0.3; e.g. below 0.25; such as below 0.2; e.g. below 0.19.

In the context of the present invention the term "coefficient of friction" depends on the material against which the friction may be created. Preferably, the "coefficient of friction" according to the present invention may be determined as the material against steel.

The coefficient of friction may be defined by the friction between the sleeve and an shaft (preferably an shaft of steel) when inserted into the circular opening. The coefficient of friction may be the ratio defining the force that resists the motion of one body in relation to another body in contact with it. This ratio may be dependent on material properties and may have a value between 0 and 1.

In an embodiment of the present invention the sleeve may be a sleeve. Preferably the sleeve may be a self-supporting sleeve.

In the context of the present invention the term "self-supporting" relates to a sleeve that is not immobilised by, or hold in place by, external means. Thus, in an embodiment of the present invention the sleeve does not comprise means external means, like straps, e.g. metal straps. Thus, the sleeve may be a self-supporting spherical seal and a slide bearing.

In an embodiment of the present invention the sleeve may provide a sealing towards an shaft when the shaft may be inserted into the sleeve. Additionally, the sleeve may provide a sealing towards the flat cover.

In an embodiment of the present invention the bearing comprises a spherical outer surface of the outer ring.

The radius of the spherical outer surface of the outer ring of the bearing may be the same, or substantially the same, as the radius of the spherical structure of the sleeve according to the present invention and/or of the shield according to the present invention.

In the present context the term "substantially the same" relates to a deviation of 10% or less, such as a deviation of 5% or less, e.g. a deviation of 2% or less; such as a deviation of 1% or less.

In a further embodiment of the present invention the bearing (when installed in the bearing house) comprises a spherical outer surface of the outer ring. Preferably, this spherical structure of the outer surface of the outer ring of the bearing may improve the contact and the ball-like or part ball-like structure of the combination of the bearing and the shield.

In yet an embodiment of the present invention the shield rests on the bearing and together the shield and the bearing may form a spherical ball or a spherical half-ball with a common spherical centre.

The bearing house may in some embodiments be described with a bearing installed in the bearing house body. The description of other embodiments of the present invention provided without a bearing installed in the bearing house body and may be considered if a bearing was installed in the bearing house body or how the construction may be may be done when a bearing subsequently is installed in the bearing house body.

In the event the bearing house body does not (directly) describe the combination of a bearing house body with a bearing installed in the bearing house body, the bearing may subsequently be installed in the bearing house body. Installation of the bearing in the bearing house body may be done at any time from acquiring the bearing house and until after attaching the bearing house to a base.

In an embodiment of the present invention the bearing house according to the present invention may comprise a bearing installed in the bearing house body.

The bearing installed in the bearing house may be a steel ball-bearing; a ceramic bearing; a slide bearing; or a roller bearing.

In a further embodiment of the present invention the bearing house according to the present invention may comprise a bearing which may be installed in the bearing house body, and the bearing may be immovable, or substantially immovable, relative to the shield.

In another embodiment of the present invention the bearing (when installed in the bearing house body) and/or the shield may be movable in contact with the bearing house body.

In an embodiment of the present invention the shield may be a spherical sealing.

In another embodiment of the present invention the shield and/or the sleeve does not comprise a separate sealing, such as an O-ring, between the shield and/or the sleeve and the shaft.

The shield and/or the sleeve according to the present invention may comprise anti-rotating means. The anti-rotating means according to the present invention may be provided to ensure that the spherical sealing of the shield and/or the sleeve does not rotate together with the rotation of the shaft when inserted into the bearing house.

In an embodiment of the present invention the shield and/or the sleeve according to the present invention may comprise anti-rotating means. In a further embodiment of the present invention the anti-rotating means ensures that the shield and/or the sleeve does not rotate together with the rotation of the shaft but allows the bearing and the shield and/or the sleeve according to the present invention to perform angular movements.

The anti-rotating means may fix, or substantially fix, rotation of the shield and/or the sleeve relative to the removal flat cover, the bearing house body and/or the bearing house cover.

In an embodiment of the present invention the anti-rotating means comprises a complementing combination of a depression and a protrusion.

The depression in may be found in one of:

the shield and/or sleeve; or the removal flat cover and/or the bearing house cover; and the protrusion may be found in the other one of:

the shield and/or sleeve; or the removal flat cover and/or the bearing house cover.

The bearing (when installed in the bearing house body) and/or the shield may be movable in contact with the removal flat cover.

In another embodiment of the present invention the bearing (when installed in the bearing house body) may be movable in contact with the bearing house body. The shield may be movable in contact with the bearing house body. Preferably, the bearing and the shield may be movable in contact with the bearing house body.

In yet an embodiment of the present invention the shield may be immovable, or substantially immovable, relative to the shaft when inserted into the bearing house and/or relative to the shaft when inserted into the bearing via the shaft insertion.

In the context of the present invention the terms “shaft” and “rotating shaft” may be used interchangeably and relates to the shaft inserted, or to be inserted, into the bearing house, via the shaft insertion and into the bearing.

In an embodiment of the present invention the shield may comprise a slide bearing. Preferably the slide bearing of the shield may be turned toward the shaft, when inserted into the bearing house, via the shaft insertion and into the bearing.

In another embodiment of the present invention the bearing house according to the present invention may comprise a bearing which may be installed in the bearing house body, and the bearing may be immovable relative to the shaft when the shaft is inserted into the bearing house. Preferably, the shaft, when inserted into the bearing house via the shaft insertion, is fixed to the bearing.

The term “when the shaft is inserted into the bearing house” may relate to a construction of the bearing house without a bearing installed, but how the bearing house would be like when the gearing may be installed in the bearing house body.

In an embodiment of the present invention the shield may comprise a seal between the bearing house body and the shield.

The shield may comprise a first circular opening facing the outside of the bearing house. The first circular opening may preferably be in contact with the shaft when inserted into the bearing house, via the shaft insertion and into the bearing.

The shield may comprise a radius of the first circular opening which may surround tightly around the shaft when inserted into the bearing house, via the shaft insertion and into the bearing.

In a preferred embodiment of the present invention the first circular opening of the shield may be provided with a sealing.

The inventors of the present invention surprisingly found that by constructing the bearing house with a spherical outer surface of the shield, and a shield which rests on a bearing having a spherical outer surface of the outer ring an increased angular movement of the shield (and/or the bearing when installed in the bearing house body and/or the shaft when inserted into the bearing house body and into the bearing) may be provided.

This construction of the bearing house according to the present invention may lead to less stress of the bearing and/or avoiding undesirable deformation of the sealings. In this way waterproof properties of the bearing house and durability of the bearing may be significantly improved, and maintenance of the bearing may be significantly reduced and lubrication may be avoided.

Thus, in an embodiment of the present invention the shield and/or the shield and the bearing may be capable of angular movement.

The angular movement may be a movement around a centre, such as a centre of the spherically formed shield.

In an embodiment of the present invention the centre of the shield may be the centre of a sphere from which the shield constitutes a specific part.

The angular movement may preferably a movement around a centre line of a cone. The centre line of the cone may extend from the spherical centre of a sphere which may be formed, partly, by the combination of the shield when resting on the bearing and along the shaft in the direction out of the bearing house body through the shaft insertion.

In addition to the angular movement of the shaft when inserted into the bearing house, the shaft may perform a rotation movement. The rotation movement may be performed around a longitudinal direction of the shaft, i.e. around the centreline of the shaft.

Prior art bearing houses may allow small angular movements or small misalignments of the shaft in angular direction with respect to the bearing house. However, in order to maintain a waterproof and a hygienic construction of the bearing house, prior art bearing houses may allow maximum angular movements or misalignments of about 1.5 degrees, without affecting seal performance and resulting in a leaky bearing house allowing water to enter the bearing house and increasing the risk of deposit or accumulation of dirt, grime, microbial material, or allergens in the bearing house. This limitation to the misalignment may be due to the construction of the bearing house and/or the immobile or fixed position of the bearing inside the bearing house.

Misalignments causing angular movement of the shaft when inserted into a bearing house may be caused by an angular misalignment of connected bearing houses and/or a parallel misalignment of connected bearing houses.

In a preferred embodiment of the present invention the shield and/or the shield and the bearing may be capable of angular movement above 1.5 degrees without compromising seal performance; such as an angular movement of 1.75 degrees or more; e.g. 2 degrees or more; such as 2.5 degrees or more; e.g. 3 degrees or more; such as 3.5 degrees or more; e.g. 4 degrees or more; such as 4.5 degrees or more; e.g. 5 degrees or more; such as 6 degrees or more; e.g. 7 degrees or more; such as 8 degrees or more; e.g. 9 degrees or more;

such as 10 degrees or more; e.g. in the range of 1.75-20 degrees; such as the range of 2-18 degrees; e.g. in the range of 3-17 degrees; such as the range of 4-16 degrees; e.g. in the range of 5-15 degrees; such as the range of 6-14 degrees; e.g. in the range of 7-13 degrees; such as the range of 8-12 degrees.

In the context of the present invention the term "seal performance" relates to the ability of the bearing house to remain waterproof and avoid water to enter the bearing house and avoid dirt, grime, microbial material, or allergens to enter and growth in the bearing house. Maintaining the seal performance may also lead to less stress of the bearing and/or avoiding undesirable deformation of the seal between the bearing house body and the shield and/or the seal provided on the first circular opening (between the shield and the shaft, when inserted into the bearing house body). In this way the bearing house may remain waterproof and durability of the bearing may be significantly improved, and/or maintenance may be significantly reduced.

If the bearing house becomes leaky and water enters the bearing house and/or when dirt, grime, microbial material, or allergens to enters the bearing house there is a need for additional lubrication to avoid water to enter, and thorough extensive cleaning is needed to avoid deposit or accumulation of dirt, grime, microbial material, or allergens in the bearing house and the risk of contamination of the hygienic environment may be significantly increased. Furthermore, in addition to handling leakage of water into the bearing house by lubrication to avoid water in the bearing house, lubrication may also cause additional maintenance and wear of the bearing which results in increased downtime of the process line and increased costs for material and manpower, in addition to increased risk deposit or accumulation of dirt, grime, microbial material, or allergens in the bearing house.

In an embodiment of the present invention the bearing house body comprises a fixed bearing house body, and a removable bearing house cover attached to the fixed bearing house body. Preferably, the bearing house body comprises a fixed bearing house body connected with the two or more bearing house feet via the arm, and a removable bearing house cover attached to the fixed bearing house body.

In another embodiment of the present invention the bearing house body comprises a fixed bearing house body, and a removable flat cover being in contact with the shield and comprising the shaft insertion. Preferably, the bearing house body comprises a fixed bearing house body connected with the two or more bearing house feet via the arm, and a removable flat cover being in contact with the shield and comprising the shaft insertion.

In yet an embodiment of the present invention the bearing house body comprises a fixed bearing house body, and a removable bearing house cover attached to the fixed bearing house body and wherein the bearing house body comprises a fixed bearing house body, and a removable flat cover being in contact with the shield and comprising the shaft insertion. Preferably, the bearing house body comprises a fixed bearing house body connected with the two or more bearing house feet via the arm, and a removable bearing house cover attached to the fixed bearing house body and a removable flat cover being in contact with the shield and comprising the shaft insertion.

The removable flat cover may be attached to the fixed bearing house body, on the opposite side of the fixed bearing house body relative to the removable bearing house cover.

In an embodiment of the present invention the bearing house body may comprise a fixed bearing house body, a removable bearing house cover; and a removable flat cover, wherein the removable flat cover comprising a shaft insertion for inserting the shaft and wherein the removable bearing house cover comprising a shaft insertion for inserting the shaft. Such construction of the bearing house according to the present invention may be provided for bearing houses where the shaft goes through the bearing house and thus two shaft insertions are needed, one shaft insertions for entering the shaft into the bearing house and one for exiting the shaft from the bearing house.

The circular structure of the outside surface of the shield may be in contact with a removable flat cover which is attached to a fixed bearing house body. When a bearing is installed in the bearing house body the removable flat cover presses the shield against the bearing. The removable flat cover may be in contact with the shield and a sealing is provide between the removable flat cover and the shield. The removable flat cover may also comprise a seal between the removable flat cover and the fixed bearing house body. Preferably, the seal between the removable flat cover and the fixed bearing house body may be configured with contours, which are adapted to the surfaces of the removable flat cover and the fixed bearing house body and thereby substantially ensure continuous surfaces of the removable flat cover and the fixed bearing house body.

In the event the bearing house may be provided with a fixed bearing house body and a flat cover, a seal may be provided between the fixed bearing house body and the flat cover.

In the event the bearing house may be provided with a fixed bearing house body and a removable bearing house cover a seal may be provided between the fixed bearing house body and the removable bearing house cover. Preferably, the seal between the fixed bearing house body and the removable bearing house cover may be configured with contours, which are adapted to the surfaces of the fixed bearing house body and the removable bearing house cover and thereby substantially ensure continuous surfaces of the fixed bearing house body and the removable bearing house cover.

In a preferred embodiment of the present invention a bearing may be installed inside the bearing house body. The bearing installed in the bearing house may be a steel ball-bearing; a ceramic bearing; a slide bearing; or a roller bearing.

In a further preferred embodiment of the present invention the bearing house may be a hygienic bearing house.

In an embodiment of the present invention the bearing house body may comprise at least one attachment means for attaching the bearing house to a base, preferable the bearing house body may comprise at least two attachment means for attaching the bearing house to a base.

Preferably, the at least one, preferably at least two, attachment means for attaching the bearing house to the base may be one or more bearing house feet for attaching the bearing house to the base, preferably, two or more bearing house feet for attaching the bearing house to the base. Each of the one or more, preferably two or more, bearing house feet may extend from the bearing house body by the means of a arm.

In addition to the unique construction of the bearing house of the present invention provided to solve the problem of misalignment of corresponding bearing houses by allowing larger angular movement, the inventors of the present invention also found that by simplifying and rebuilding the bearing house, cleaning in, on and around the bearing house may be much easier and the incidence of deposits or accumulation of dirt, grime, microbial material, or allergens, on, in or around the bearing house, may be significantly reduced or even avoided, and at the same time without compromising strength, robustness or stability of the bearing house.

Thus, a preferred embodiment of the present invention relates to a bearing house comprising a bearing house body for receiving a rotating shaft, and one or more, preferably two or more, bearing house feet for attaching the bearing house to a base, wherein each of the one or more, preferably two or more, bearing house feet extends from the bearing house body by the means of an arm.

In the context of the present invention the term “attaching” relates to the fixation of one element to another element. In an embodiment of the present invention the term “attaching the bearing house to a base” relates to the fixation of the bearing house to the base making it immobile or substantially immobile.

The bearing house may be mounted in a vertical position or in a horizontal position to the base, depending on the application and/or the location of the bearing house.

One of the unique features of the bearing house according to the present invention may be the projection of the one or more bearing house feet next to the bearing house body by introducing an arm between each of the one or more, preferably two or more, bearing house feet and the bearing house body. In the present context the term “extend from” relates to stretching out one or more bearing house feet from the bearing house body.

Preferably, the one or more bearing house feet are extended from or stretched out from the bearing house and separated by an arm.

In an embodiment of the present invention the arm may be used for extending the bearing house feet from the bearing house body and between one or more bearing house feet. If three or more, or four or more bearing house feet are connected to each other, one or more bearing house feet may be attached to the bearing house body via another bearing house foot.

In the present context the term “arm” relates to a piece of material used to create or maintain a space between two elements, in particular between each of the one or more, preferably two or more, bearing house feet and the bearing house body and/or between individual bearing house feet. The arm according to the present invention may be constructed to improve and/or ease cleaning in, on or around the bearing house and at the same time to provide strength and stability to the bearing house.

In an embodiment of the present invention the arm may be made of the same material as the material used in the one or more bearing house feet and/or in the bearing house body.

In another embodiment of the present invention the arm may be made of a different material than the material used in the one or more bearing house feet and/or in the bearing house body.

In an embodiment of the present invention the bearing house comprise 1 or more bearing house feet each extending from the bearing house body by the means of a arm, such as 2 or more bearing house feet, e.g. 3 or more bearing house feet, such as 4 or more bearing house feet, e.g. 5 or more bearing house feet, such as 6 or more bearing house feet, e.g. 8 or more bearing house feet.

In a preferred embodiment of the present invention the bearing house comprises 2-4 bearing house feet, which each extending from the bearing house body by the means of a arm.

In a further embodiment of the present invention the bearing house feet may involve a flange.

The bearing house feet or the flange may be fitted with attachment means. The attachment means may include nuts and bolts where the bolt is going through the bearing house feet or the flange, preferably in longitudinal direction relative to the direction of the bearing house feet or the flange, and through the base.

In an embodiment of the present invention each of the one or more bearing house feet may comprises attachment means for attaching the bearing house to the base.

In a further embodiment of the present invention the base may be a part of a machine, a device, an equipment, or the like.

The inventors of the present invention surprisingly found that by reducing the amount of material being in contact with the base, areas or spots available for dirt, grime, microbial material and/or other fouling materials to hide and accumulate may be significantly reduced and/or by reconstructing the bearing house it has become easier to clean in, on and around the bearing house with easy access for cleaning from all angles around the bearing house. This improved construction surprisingly makes wash-down and cleaning more efficient and/or more reliable resulting in the above-mentioned reductions.

In an embodiment of the present invention the one or more bearing house feet may be the only part of the bearing house which is in contact with the base.

In a further embodiment of the present invention the bearing house body and/or the arm is/are not in contact with the base.

In this situation, where the one or more bearing house feet may be the only part of the bearing house which is in contact with the base and/or where the bearing house body and/or the arm is/are not in contact with the base, an open space is left between the part of the bearing house not in contact with the base (e.g. the bearing house body and/or the arm) and the base. Preferably, the open space between the bearing house body and the base, and/or the open space between the arm and the base, is more than 1 mm, such as more than 3 mm, e.g. more than 5 mm, such as more than 1 cm, e.g. more than 1.5 mm, such as more than 2.5 mm, such as in the range of 0.1-5 cm; e.g. in the range of 0.2-3 cm; such as in the range of 0.3-3 cm; e.g. in the range of 0.5-2.75 cm; such as in the range of 0.75-2.54 cm.

In an embodiment of the present invention the bearing house body may comprise at least two contact points with a base. The contact points may preferably be visual contact points.

Preferably the contact points of the bearing house with the base may be provided by the at least two feet.

In an embodiment of the present invention the length of the one or more bearing house feet may be in the direction substantially longitudinal to the opening for receiving the rotating shaft.

In a further embodiment of the present invention the length of the one or more bearing house feet may be in the direction substantially perpendicular to the direction of the base where the bearing house may be mounted.

In an embodiment of the present invention the one or more bearing house feet may be further extended to make an additional distance between the bearing house body and the base. The further extension of the one or more bearing house feet may be provided by introducing feet-spacers to each of the one or more bearing house feet until the desired length has been reached. Preferably, a seal may be placed between each of the feet-spacers and each of the one or more bearing house feet. Preferably, a seal is placed between each of the feet-spacers and the base.

In an embodiment of the present invention the one or more bearing house feet may be further extended to make an additional distance between the bearing house body and the base. The further extension of the one or more bearing house feet may be provided by introducing feet-spacers to each of the one or more bearing house feet until the desired length has been reached. Preferably, a seal may be placed between each of the feet-spacers and each of the one or more bearing house feet. Preferably, a seal may be placed between each of the feet-spacers and the base.

Misalignment between corresponding bearing houses occurs. Hence, terms like "substantially perpendicular" and/or "substantially longitudinal" of bearing houses may be subjected to a deviation between 0-20° and still be considered within the range covered by substantially longitudinal direction, or within the range covered by substantially perpendicular, without compromising the hygiene safety, strength or stability; such as between 2°-17°, e.g. between 3°-15°, such as between 4°-12°, e.g. between 5°-11°, such as between 6°-10°.

The inventors of the present invention have found that by reducing the amount of material used when constructing the bearing house cleaning around the bearing house and cleaning from various angles around the bearing house was much easier and significantly more efficient and/or more reliable resulting in a limitation or even avoiding deposit or accumulation of dirt, grime, microbial material, or allergens, on, in or around the bearing house would be advantageous.

The inventors of the present invention surprisingly found that in particular the amount of material use for constructing the part between the bearing house body and the two or more bearing house feet may be reduced. The inventors of the present invention surprisingly found that by replacing this part of the bearing house (the part between the bearing house body and each of the two or more bearing house feet) may be replaced with a arm according to the present invention without compromising the strength, robustness or stability of the bearing house.

The arm according to the present invention may have:

- a length (I) determining how far each of the one or more bearing house feet extend from the bearing house body. Preferably, each of the arms may have the same length (1);
- a height (h) determined in the direction from the bearing house to the base. Preferably, each of the arms may have the same height (h);
- a width (w) determined in the direction perpendicular to the direction from the bearing house to the base. Preferably, each of the arms may have the same height (h).

In an embodiment of the present invention the one or more bearing house feet may have a length which is larger (determined from the top of the bearing feet to the base) than the height of the arm.

By constructing the bearing house with the one or more bearing house feet having a length which may be larger than the height of the arm an open space may be provided between the arm and the base. This open space may improve and ease cleaning in, on and around the bearing house and also easier cleaning from various angles of the bearing house, bearing house body, the fixed bearing house body, and/or the one or more bearing house feet.

In an embodiment of the present invention the arm may be placed relative to the base and/or the one or more bearing house feet to provide an open space between the arm and the base.

Preferably, the open space between the arm and the base is more than 1 mm, such as more than 3 mm, e.g. more than 5 mm, such as more than 1 cm, e.g. more than 1.5 mm, such as more than 2.5 mm; such as in the range of 0.1-5 cm; e.g. in the range of 0.2-3 cm; such as in the range of 0.3-3 cm; e.g. in the range of 0.5-2.75 cm; such as in the range of 0.75-2.54 cm.

In an embodiment of the present invention the width of one or arm may be equal to or smaller than the width of the two or more bearing house feet.

The construction according to the present invention, relative to prior art construction of bearing houses, may involve removal of material around the two or more bearing house feet and/or removal of material between the two or more bearing house feet and the bearing house body and the individual elements (such as the two or more bearing house feet; the bearing house body; and/or the arm, may be easily differentiated.

In an embodiment of the present invention the arm may be easily distinct from the one or more bearing house feet.

In a further embodiment of the present invention the arm may be easily distinct from the bearing house body.

In an even further embodiment of the present invention the one or more bearing house feet may be easily distinct from the bearing house body In the present context the term "easily distinct" relates to a clear difference between the elements of the bearing house, such as a difference between the bearing house body and the one or more bearing house feet; between the one or more bearing house feet and the arm; and/or between the bearing house body and the arm). In an embodiment of the present invention the difference may be a visual differentiation.

In an embodiment of the present invention the fixed bearing house body, the arm and the one or more bearing house feet may be produced, e.g. by moulding, preferably moulded in one piece.

As mentioned above the construction, the design and/or the fabrication of the arm may assist in improving the cleaning and the arm according to the present invention may improve drainage, such as being able to self-drain liquids, such as aqueous suspension, e.g. an aqueous cleaning solution. By making cleaning easier and more effective, and by introducing easy draining, or even self-draining surfaces of the bearing house, and in particular the arm, the incidence and/or risk of hiding or accumulation of dirt, microbial material or other contaminating material may be reduced or even avoided.

In an embodiment of the present invention the arm may be formed as a polyhedron, such as a triangular prism; a square prism; a pentagonal prism; or a hexagonal prism.

Preferably, the arm may be formed as a triangular prism.

In another embodiment of the present invention the polyhedron may be a frustum. In the context of the present invention the term "frustum" relates to a structure topologically identical to a prism, with trapezoid lateral faces and different sized top and bottom polygons.

In an embodiment of the present invention the arm comprises a first curvature end aligned with the radius of the bearing house body and a second curvature end aligned with the radius of the bearing house feet. Preferably, the radius of the first curvature end is larger than the radius of the second curvature end.

In an embodiment of the present invention the term "curvature end" relates to an end that has aligned and adapted to the surface that the end is attached.

The triangular prism may comprise three rectangular parts and two triangular ends, preferably the two triangular ends have dissimilar dimensions. In an embodiment of the present invention the triangular end being connected to the bearing house has a radius which is larger than the radius of the triangular end being connection to one of the two or more bearing house feet.

In an embodiment of the present invention the first end of the two triangular ends may be attached to the bearing house body and the second end of the two triangular parts may be attached to one of the two or more bearing house feet.

The arm may take different forms depending and shapes and at least one edge of the polyhedron, e.g. of the triangular prism, may be straight shaped, concave shaped or convex shaped.

The at least one edge of the polyhedron, e.g. of the triangular prism, may be concave shaped and at least one length of the edge of the triangular prism may be convex shaped.

In an embodiment of the present invention a tip of the polyhedron, e.g. of the triangular prism, may be pointing towards the base.

In an embodiment of the present invention the term "tip of the polyhedron" relates to one of the edges of the polyhedron, e.g. the triangular prism. Preferably, the one of the edges of the polyhedron, e.g. the triangular prism, is pointing toward the base, preferably directly towards the base.

By the above-mentioned structure of the bearing house a limited amount of the bearing house is in contact with the base and/or a larger open space around the bearing house may be provided allowing an easier and more efficient and/or more reliable cleaning resulting in a limitation or even to avoid deposit or accumulation of dirt, grime, microbial material, or allergens, on, in or around the bearing house.

For improving maintenance of the bearing house, the bearing inside the bearing house during use and/or for ease installation of a beating and/or a shaft in the bearing house the bearing house body may be provided in different elements which may be joint forming the bearing house body.

In an embodiment of the present invention the seal/sealings according to the present invention may preferably be configured with contours which are adapted to the structure of the surfaces connected or elements connected and thereby substantially ensure a continuous or substantially continuous surface in the joints between surfaces or elements connected, such as the joints between the fixed bearing house body and the removable bearing house cover; and/or the joints between the two or more bearing house feet and the base; and/or the joint between the fixed bearing house body and the flat cover; the joint between the bearing house and the shield; and/or the sealing provided on the first circular opening (being in contact with the shaft when inserted into the bearing house body).

By means of the seal/sealings according to the present invention, dirt, grime, microbial material (such as bacteria or fungus), or other fouling materials, such as allergens, may be hindered or prevented from entering the gaps or joints between connecting surfaces or elements.

The seal or sealings according to the present invention may be prepared from a non-conductive material. The seal, sealings or conductive material may be silicone. Preferably, the seal or sealings may be prepared from soft silicone. Preferably, the seal has a blue color, preferably RAL 5010, which provides an improved visual inspection of the hygienic level and/or cleaning quality.

In an embodiment of the present invention each of the two or more bearing house feet may comprise a sealing between each of the two or more bearing house feet and the base.

The bearing house may be made of a plastic material or a metal material or a combination hereof. The plastic material may be selected from a polypropylene material. Preferably, the polypropylene material may be a sturdy polypropylene material. The metal material may be stainless steel.

In an embodiment of the present invention all exposed surfaces of the bearing house may have a smooth finish such that dirt, grime, microbial material (such as bacteria or fungus), or other fouling materials, such as allergens, may be cleaned from the surface Preferably, the bearing house according to the present invention may be free of joints, pits, folds, cracks, crevices, and other imperfections in the final fabricated form, when installed on the machinery and/or when working within the specified load conditions.

Preferably, none of the exposed surfaces of the bearing house according to the present invention comprising knurled surfaces.

All the exposed surfaces of the bearing house according to the present invention may preferably be cleanable.

All the exposed surfaces of the bearing house according to the present invention may preferably be inspectable.

In the context of the present invention the terms "surface" and "exposed surface" may be used interchangeably and relates to any surface that may be accessible to dirt, grime, microbial material (such as bacteria or fungus), or other fouling materials, such as allergens.

In an embodiment of the present invention all the exposed surfaces of the bearing house according to the present invention may be self-draining. I a further embodiment of the present invention the bearing house comprises no surfaces which has one or more pockets which may retain liquids.

In the context of the present invention, the term "self-draining" relates to a surface constructed, designed and/or fabricated in a manner allowing aqueous suspension, such as aqueous cleaning suspension, like water, to escape and/or leaving the surface.

In a preferred embodiment cleaning of the bearing house may be by manual cleaning. During manual cleaning, removal of dirt, grime, microbial material, or other fouling materials may be affected by an aqueous suspension, e.g. chemical and/or water rinses, optionally with the assistance of one or a combination of brushes, nonmetallic scouring pads and scrapers. Rinses may be performed by high- or low-pressure hoses, and/or with cleaning aids manipulated by hand.

In order to limit accumulation and/or growth of dirt, grime, microbial material or other fouling materials on the exposed surfaces of the bearing house and to improve drainage of aqueous suspension, e.g. water, from the surface, the surface of the bearing house may be a smooth surface.

In an embodiment of the present invention the surface of the bearing house may be smooth. Preferably, the smooth surface of the bearing house may allow drainage, preferably self-drainage, of liquids from the surface.

Smoothness of the exposed surface of the bearing house according to the present invention may be determined by the "Roughness Average (Ra)". Roughness Average or Ra is an arithmetical mean of the absolute values of the surface profile departure within a sampling length. In the context of the present invention the roughness (Ra) of the surface of the bearing house may be determined according to the ISO 4287:1997 standard.

Preferably the surface of the bearing house according to the present invention may comprise all the exposed surfaces of the bearing house.

The surface of the bearing house may have a roughness below Ra 2.0 µm; such as Ra 1.8 µm; e.g. Ra 1.6 µm; such as Ra 1.4 µm; e.g. Ra 1.2 µm; such as Ra 1.0 µm; e.g. Ra 0.8 µm; such as Ra 0.6 µm; e.g. Ra 0.4 µm.

Preferably, the bearing house according to the present invention comprises no exposed surfaces; ledges and/or edges which are horizontal.

In an embodiment of the present invention the bearing house all exposed surfaces; ledges and/or edges are curvilinear or curved.

In order to ensure high drainage effect at least one of the exposed surfaces; ledges and/or edges of the bearing house, preferably all exposed surfaces; ledges and/or edges, may have an angle, may be founded or has a curvature relative to horizontal.

In an embodiment the present invention at least one of the exposed surfaces; ledges and/or edges of the bearing house, preferably all exposed surfaces; ledges and/or edges, may have a radius of 1 mm or above improving water runoff from at least one of the exposed surfaces, preferably all the exposed surfaces; ledges and/or edges of the bearing house; such as a radius of 2 mm or above; e.g. a radius of as 3 mm or above, such as a radius of 3.2 mm or above; e.g. a radius of 3.5 mm or above; such as a radius of 4 mm or above, e.g. 5 mm or above.

Preferably the bearing house comprises no exposed surfaces; ledges and/or edges having a radius below 3.2 mm; such as below 3 mm; e.g. below 2.5 mm; such as below 1 mm; e.g. below 0.8 mm.

In an embodiment of the present invention all the exposed surfaces; ledges and/or edges of the bearing house; may have an angle, may be founded or has a curvature of at least 3 degree relative to horizontal; e.g. 3.2 degree or above relative to horizontal, such as 3.5 degree or above relative to horizontal; e.g. 3.75 degree or above relative to horizontal; such as 4 degree or above relative to horizontal, e.g. 5 degree or above relative to horizontal.

In an embodiment of the present invention the exposed surfaces, ledges and/or edges of the bearing house may be constructed, designed and/or fabricated in accordance with national standards and/or directives, like one or more of:

- EN 1672-2:2005 Food machinery/General design principles/Part 2: Hygiene requirements.
- EN ISO 14 159 2004 Safety of machinery—Hygiene requirements for the design of machinery.
- Document 13 EHEDG guideline on the hygienic design of apparatus for open processes.
- EHEDG Class I: The hygienic design criteria evaluation report concludes that the designs meet the criteria for hygienic equipment class I for components situated in the non-food area and are accessible for easy cleaning without dismantling.
- 3-A sanitary standard for machine levelling feet and supports.
- USDA Guidelines for the sanitary design and fabrication of dairy processing equipment June 2001.

and/or national regulations, such as one or more of:

- 852/2004 on the hygiene of foodstuffs.
- 853/2004 specific hygiene rules for food of animal origin.
- 854/2004 specific rules for the organization of official controls on products of animal origin intended for human consumption.
- 1935/2004 on materials and articles intended to come into contact with food.

The bearing house according to the present invention may be provided with a bearing. A bearing according to the present invention may be a machine element that constrains relative motion to only the desired motion, and reduces friction between moving parts, e.g. a shaft, relative to a non-moving parts, e.g. the bearing house. Preferably the bearing house may comprise a bearing suitable for receiving a rotating shaft.

In an embodiment of the present invention the bearing may be a ceramic bearing or a stainless-steel bearing. Preferably, the bearing may be a ceramic bearing.

In an embodiment of the present invention the beating may be a fat free and/or a lubricant free bearing. Due to the construction, design and fabrication of the bearing house and the reduced number of elements joint and protected by a sealing ensure a waterproof bearing house, preferably a long-term waterproof property, the bearing house according to the present invention.

In an embodiment of the present invention the bearing house consist essentially of a bearing house body having two or more bearing house feet (preferably between 2 and 4 bearing house feet) extending from the bearing house body by means of a arm, a joint (and a sealing) between the bearing house body and a removable flat cover; a joint (and a sealing) between the bearing house body and a removable bearing house cover; a joint (and a sealing) between each of the bearing house feet of the bearing house body and the base; and a joint (and a sealing) between each of the bearing house feet of the bearing house body and each of the bolts used to attach the bearing house to the base.

Preferably, the bearing house according to the present invention comprises (or consist essentially) of the following components:

- a bearing house body;
- one or more bearing house feet extending from the bearing house body by means of a arm,
- a removable flat cover and a joint (and a sealing) between the bearing house body and the removable flat cover;
- a removable bearing house cover and a joint (and a sealing) between the bearing house body and the removable bearing house cover;
- a joint (and a sealing) between each of the bearing house feet of the bearing house body and a base;
- and a joint (and a sealing) between each of the bearing house feet of the bearing house body and each of the bolts used to attach the bearing house to the base, wherein the components may be configured with contours, which are adapted to the surfaces of the components and thereby substantially ensure continuous surfaces of the components of the bearing house.

In a preferred embodiment of the present invention the bearing house may be a hygienic bearing house.

In the context of the present invention the term "hygienic bearing house" relates to a bearing house adapted for reducing or preventing dirt, grime, microbial material, or other kind of fouling to access gap; joints; pits; folds; cracks; crevices; or other imperfections, in or between connecting surfaces or elements.

In an embodiment of the present invention the bearing house according to the present invention may be provided with a built-in sensor. Preferably, the built-in sensor may transmit data, such as operating data or construction data to a mobile device and/or to a cloud surveillance of the bearing house.

By introducing such sensor into the bearing house according to the present invention a safer operation, a more efficient operation, an improved maintenance and/or a reduced downtime of the machinery may be provided.

In an embodiment of the present invention the sensor is implemented into the removable bearing house cover.

In an embodiment of the present invention the sensor may be configures to monitor one or more of vibrations, temperature, leakage, moisture, exterior cleaning and/or location of the bearing house.

A preferred embodiment of the present invention relates to the use of the bearing house according to the present invention, for use in environments with high hygienic requirements, high cleaning requirements and/or environments where low (or no) deposit or accumulation of dirt, grime, microbial material and/or allergens is accepted.

Preferably, the present invention relates to the use of the bearing house according to the present invention, for use in food production industry, feed production industry, and/or pharmaceutical industry.

A preferred embodiment of the present invention relates to a device comprising a bearing house according to the present invention.

The base may be a part of a machine, a device, an equipment, or the like. Preferably, the machine, the device, or the equipment may be a conveyer belt for the food production industry, feed production industry, and/or pharmaceutical industry.

In an embodiment of the present invention, the device may be a hygienic device.

It should be noted that embodiments and features described in the context of one of the aspects of the present invention also apply to the other aspects of the invention.

The invention claimed is:

1. A bearing house (1) comprising a bearing house body (2) for holding a bearing (3), and at least one conducting element (50) providing an electrical connection between an inside of the bearing house body (2) and an outside material, wherein the at least one conducting element (50) comprises an electrically conductive material in the form of a spring, a flexible tap, or pogo pins, and wherein the at least one conducting element (50) is in physical contact with a non-rotating part of the bearing (3) during use.

2. The bearing house (1) according to claim 1, wherein the electrical connection is configured to transfer static electricity through the bearing (3), when the bearing (3) is inserted into the bearing house (1), through the at least one conducting element (50) to the outside material.

3. The bearing house (1) according to claim 1, wherein the electrical connection is configured to transfer static electricity from a rotatable shaft when inserted into the bearing house, through the bearing when the bearing is inserted into the bearing house, and through the at least one conducting element to the outside material.

4. The bearing house (1) according to claim 1, wherein the outside material is a material different from a material constituting the bearing house (1), or different from a material constituting the bearing (3) inserted into the bearing house (1), or different from the material constituting a shaft (11) inserted into the bearing (3) and the bearing house (1).

5. The bearing house (1) according to claim 1, wherein the bearing house body (2) is comprised of a non-conductive material.

6. The bearing house (1) according to claim 1, wherein the electrically conductive material is made of a metal material and is an electrically conductive metal material.

7. The bearing house (1) according to claim 1, wherein the electrical connection is connected to one or more bearing house feet (7) and/or one or more attachment means (8) providing an electrical connection from the inside of the bearing house body (2) to the outside material.

8. The bearing house (1) according to claim 7, wherein the bearing house (1) is provided with at least one hole between the inside of the bearing house body (2) and the outside material.

9. The bearing house (1) according to claim 8, wherein the least one hole (53) extends between the inside of the bearing house body (2) and the one or more bearing house feet (7) and/or one or more attachment means (8).

10. The bearing house (1) according to claim 1, wherein the bearing house (1) comprises a shield (4) forming a shaft insertion (6) for inserting a shaft (11) into the bearing house (1) wherein the shield (4) is formed with a spherical outer surface (4*a*) which is movable in contact with the bearing house body (2) and the shield (4) rests on the bearing (3) when installed in the bearing house body (2).

11. The bearing house (1) according to claim 1, wherein the spring is a spiral spring or a plate spring.

12. The bearing house (1) according to claim 1, wherein the bearing (3) when installed within the bearing house body (2) is configured to move angularly relative to the bearing house body (2) during use.

* * * * *